US012703342B2

(12) United States Patent
Takahashi et al.

(10) Patent No.: US 12,703,342 B2
(45) Date of Patent: Aug. 11, 2026

(54) VEHICLE CONTROL DEVICE AND VEHICLE CONTROL METHOD

(71) Applicants: MITSUBISHI JIDOSHA KOGYO KABUSHIKI KAISHA, Tokyo (JP); The University of Tokyo, Tokyo (JP)

(72) Inventors: Ryota Takahashi, Tokyo (JP); Hiroshi Fujimoto, Tokyo (JP); Hiroyuki Fuse, Tokyo (JP); Guangzhi Yu, Tokyo (JP); Naoki Takahashi, Tokyo (JP); Yutaro Okamura, Tokyo (JP); Shunsuke Matsuo, Tokyo (JP); Ryosuke Koga, Tokyo (JP)

(73) Assignees: MITSUBISHI JIDOSHA KOGYO KABUSHIKI KAISHA, Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 19/099,082

(22) PCT Filed: Jul. 11, 2023

(86) PCT No.: PCT/JP2023/025522
§ 371 (c)(1),
(2) Date: Jan. 28, 2025

(87) PCT Pub. No.: WO2024/038709
PCT Pub. Date: Feb. 22, 2024

(65) Prior Publication Data
US 2026/0028012 A1 Jan. 29, 2026

(30) Foreign Application Priority Data
Aug. 16, 2022 (JP) ................................ 2022-129525

(51) Int. Cl.
*B60W 10/16* (2012.01)
*B60W 30/18* (2012.01)
(Continued)

(52) U.S. Cl.
CPC ...... *B60W 10/16* (2013.01); *B60W 30/18145* (2013.01); *B60W 30/20* (2013.01);
(Continued)

(58) Field of Classification Search
CPC .................................................... B60W 10/04
See application file for complete search history.

(56) References Cited

U.S. PATENT DOCUMENTS 7,583,036 B2 * 9/2009 Kikuchi ................. B60W 20/11
318/8
9,725,014 B2 * 8/2017 Honda .................. G05D 1/021
(Continued)

FOREIGN PATENT DOCUMENTS

JP 2019-103249 A 6/2019

OTHER PUBLICATIONS

English translation of the International Search Report for International Application No. PCT/JP2023/025522, dated Sep. 26, 2023.
(Continued)

*Primary Examiner* — Huan Le
(74) *Attorney, Agent, or Firm* — Birch, Stewart, Kolasch & Birch, LLP

(57) ABSTRACT

A control device includes: a first calculator that calculates a first equivalent sum value corresponding to a sum of left and right requested torques and a first equivalent difference value corresponding to a difference between the left and right requested torques; a first controller that outputs a first instruction torque; an estimator that estimates an estimated sum speed and an estimated difference speed; a second calculator that calculates a second equivalent sum value
(Continued)

corresponding to a sum of two actual speeds of the left and right driving sources and a second equivalent difference value corresponding to a difference between the two actual speeds; a second controller that outputs a second instruction torque; and a third controller that controls outputs of the left and right driving sources, using the first and second instruction torques.

17 Claims, 10 Drawing Sheets

(51) Int. Cl.
*B60W 30/20* (2006.01)
*B60W 50/00* (2006.01)

(52) U.S. Cl.
CPC ..... *B60W 50/00* (2013.01); *B60W 2050/0008* (2013.01); *B60W 2050/0012* (2013.01); *B60W 2050/0031* (2013.01); *B60W 2050/0052* (2013.01); *B60W 2520/105* (2013.01); *B60W 2520/14* (2013.01); *B60W 2530/10* (2013.01)

(56) References Cited

U.S. PATENT DOCUMENTS 11,110,805 B2 * 9/2021 Hirata ...................... B60K 1/02
11,511,726 B2 * 11/2022 Park ................ B60W 30/18027

OTHER PUBLICATIONS

International Preliminary Report on Patentability and Written Opinion of the International Searching Authority for International Application No. PCT/JP2023/025522, dated Feb. 27, 2025, with English translation.

* cited by examiner

FIG. 4

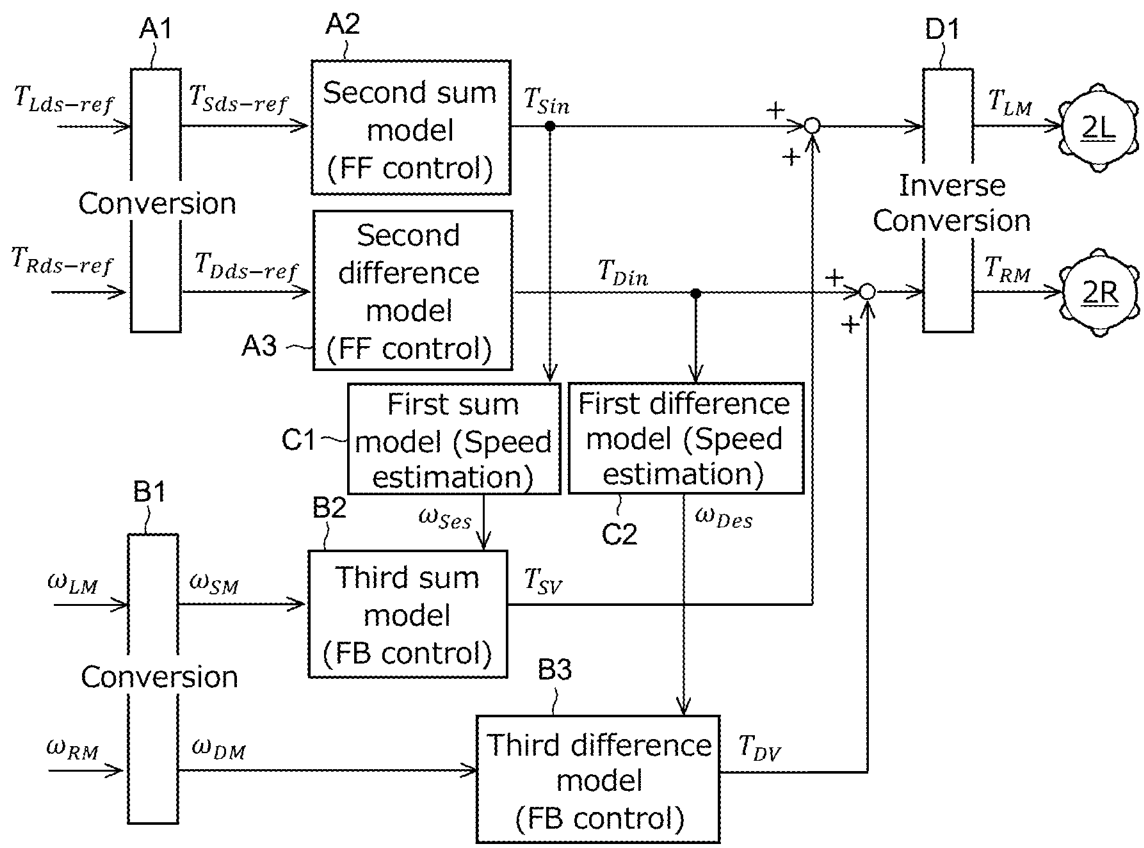

$T_{Lds-ref}$ : Left-axle requested torque (Left requested torque)
$T_{Rds-ref}$ : Right-axle requested torque (Right requested torque)
$T_{Sds-ref}$ : Sum requested torque (First equivalent sum value)
$T_{Dds-ref}$ : Difference requested torque (First equivalent difference value)
$T_{Sin}$ : First sum instruction torque (First instruction torque)
$T_{Din}$ : First difference instruction torque (First instruction torque)
$\omega_{Ses}$ : Estimated sum angular speed (Estimated sum speed)
$\omega_{Des}$ : Estimated difference angular speed (Estimated sum speed)
$\omega_{LM}$ : Actual angular speed of left motor
$\omega_{RM}$ : Actual angular speed of right motor
$\omega_{SM}$ : Sum motor angular speed (Second equivalent sum value)
$\omega_{DM}$ : Difference motor angular speed (Second equivalent difference value)
$T_{SV}$ : Second sum instruction torque (Second instruction torque)
$T_{DV}$ : Second difference instruction torque (Second instruction torque)
$T_{LM}$ : Left instruction torque
$T_{RM}$ : Right instruction torque

VEHICLE CONTROL DEVICE AND VEHICLE CONTROL METHOD

TECHNICAL FIELD

The embodiment discussed herein relates to a vehicle control device and a vehicle control method that controls a driving source mounted on a vehicle.

BACKGROUND TECHNIQUE

Conventionally, for a vehicle provided with multiple driving sources, a method has been known in which an operating state of each driving source is controlled while suppressing vibration of a driving power transmission system by using a vehicle model that models the behavior of the driving power transmission system (see Patent Document 1).

PRIOR ART DOCUMENT

Patent Document

[Patent Document 1] JP 2019-103249 A

SUMMARY OF INVENTION

Problems to be Solved by Invention

The behavior (in particular, vibration) of the driving power transmission system while the vehicle is running straight is different from the behavior while the vehicle is cornering. For the above, there is need to construct a control to deal with a vehicle while running straight and a control to deal with the vehicle while cornering, and constructing controls for the left and right driving systems separately from each other would result in a complex control configuration. In addition, the traveling state of a vehicle is sometimes a combined state in which a running-straight state (translational motion) and a cornering state (yaw motion) are mixed, which makes it difficult to enhance the controllability. For example, when control for suppressing the vibration of one of the left and right axles is performed, since the control (output) also affects the other axle, decoupling not to affect each other is required, which complicates the control configuration. This means that it is difficult to appropriately suppress vibrations having a different characteristic between a running-straight state and a cornering state at each of the left and right axles.

When the above-described vibration suppressing control is performed as a feed-forward control, there is a possibility that vibration that cannot be suppressed by the feed-forward control is transmitted to the axles. As a solution to the above, a method is conceivable which enhances the vibration suppressing effect by combining the feed-forward control and the feed-back control. However, if the feed-forward control and the feed-back control interfere with each other when these controls are carried out in combination, it is difficult to achieve the respective target outputs.

With the foregoing problems in view, one of the objects of the present disclosure is to provide a vehicle control device and a vehicle control method that can suppress vibrations on left and right axles with a simple configuration, avoiding interference between a feed-forward control and a feed-back control and also avoiding interference between the vibrations. In addition to this object, actions and effects which are derived from each configuration of "Embodiment to Carry out Invention" to be described below and which conventional technique does not attain are regarded as other objects of the present disclosure.

Means to Solve Problems of Invention

The disclosed vehicle control device and vehicle control method can be achieved in the embodiment and the application to be disclosed below and solve at least some of the above problems.

The disclosed vehicle control device is for a vehicle including: a left driving system including a left axle and a left wheel, motion power from a left driving source being transmitted to the left axle and the left wheel; a right driving system including a right axle and a right wheel, motion power from a right driving source being transmitted to the right axle and the right wheel; and detectors that each detect one of an actual speed of the left driving system or the left driving source and an actual speed of the right driving system or the right driving source. The vehicle control device includes: a first calculator that calculates a first equivalent sum value corresponding to a sum of a left requested torque being a requested torque to the left driving system or the left driving source and a right requested torque being a requested torque to the right driving system or the right driving source and calculates a first equivalent difference value corresponding to a difference between the left requested torque and the right requested torque; a first controller that outputs a first instruction torque to control the left driving source and the right driving source by performing a feed-forward control using the first equivalent sum value and the first equivalent difference value; an estimator that estimates, based on the first instruction torque, an estimated sum speed corresponding to a sum of an estimated speed of the left driving source and an estimated speed of the right driving source and an estimated difference speed corresponding to a difference between the two estimated speeds; a second calculator that calculates a second equivalent sum value corresponding to a sum of the two actual speeds and a second equivalent difference value corresponding to a difference between the two actual speeds; a second controller that outputs a second instruction torque to control the left driving source and the right driving source by performing a feed-back control based on a gap between the second equivalent sum value and the estimated sum speed or a gap between the second equivalent difference value and the estimated difference speed; and a third controller that controls outputs of the left driving source and the right driving source, using the first instruction torque and the second instruction torque.

The disclosed vehicle control method is for a vehicle including: a left driving system including a left axle and a left wheel, motion power from a left driving source being transmitted to the left axle and the left wheel; a right driving system including a right axle and a right wheel, motion power from a right driving source being transmitted to the right axle and the right wheel; and detectors that each detect one of an actual speed of the left driving system or the left driving source and an actual speed of the right driving system or the right driving source The vehicle control method includes: calculating a first equivalent sum value corresponding to a sum of a left requested torque being a requested torque to the left driving system or the left driving source and a right requested torque being a requested torque to the right driving system or the right driving source and calculating a first equivalent difference value corresponding to a difference between the left requested torque and the right requested torque; outputting a first instruction torque to control the left driving source and the right driving source by performing a feed-forward control using the first equivalent sum value and the first equivalent difference value; estimating, based on the first instruction torque, an estimated sum speed corresponding to a sum of an estimated speed of the left driving source and an estimated speed of the right driving source and an estimated difference speed corresponding to a difference between the two estimated speeds; calculating a second equivalent sum value corresponding to a sum of the two actual speeds and a second equivalent difference value corresponding to a difference between the two actual speeds; outputting a second instruction torque to control the left driving source and the right driving source by performing a feed-back control based on a gap between the second equivalent sum value and the estimated sum speed and a gap between the second equivalent difference value and the estimated difference speed; and controlling outputs of the left driving source and the right driving source, using the first instruction torque and the second instruction torque.

Effect of Invention

The disclosed vehicle control device and vehicle control method can suppress vibrations on left and right axles with a simple configuration, avoiding interference between a feed-forward control and a feed-back control and also avoiding interference between the vibrations.

BRIEF DESCRIPTION OF DRAWINGS

FIG. 4 is a block diagram showing a vehicle control method.

EMBODIMENT TO CARRY OUT INVENTION

Examples of the type of a vehicle that adopts a vehicle control device and a vehicle control method disclosed herein are an engine vehicle (a gasoline-powered vehicle, a diesel-powered vehicle), an electric vehicle, and a hybrid vehicle. The vehicle is an automobile that travels by driving left and right wheels (left and right driving wheels) using at least one driving source (e.g., an internal combustion engine or a motor), and is preferably an automobile that travels by driving left and right wheels (left and right drive wheels) using multiple driving sources. Here, one of the multiple driving sources is referred to as a left driving source, and another one of the driving sources is referred to as a right driving source. In addition, one of the left and right wheels positioned on the left side of the vehicle is referred to as a left wheel, and the other is referred to as a right wheel. The disclosed vehicle control device and vehicle control method can be used in controlling a vehicle provided with a left driving system including a left axle and a left wheel to which motion power from the left driving source is transmitted and a right driving system including a right axle and a right wheel to which motion power from the right driving source is transmitted.

The layout of each of the left driving source and the right driving source may or may not be set to correspond to the left-right direction determined based on the forward-traveling direction of the vehicle. The left driving system and the right driving system may operate independently of each other, or may be connected to each other via a transmission mechanism or a power distributing mechanism. The disclosed vehicle control device and vehicle control method can be used to control an in-wheel motor vehicle that drives the left and right wheels with respective different motors and also to control a torque vectoring vehicle in which the left and right wheels can transmit a driving force and a torque to each other.

EMBODIMENT

1. Configuration

Figure 1:
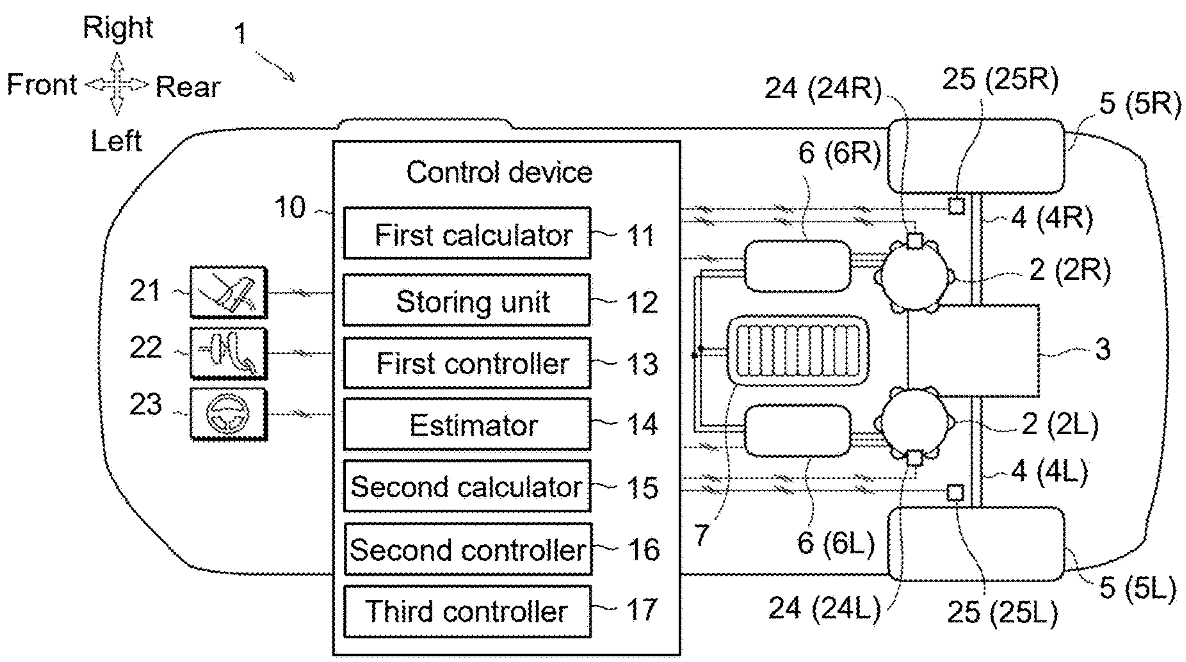
FIG. 1 is a block diagram showing a configuration of a control device and a vehicle.

A control device 10 according to an embodiment is mounted on a vehicle 1 shown in FIG. 1. The vehicle 1 includes left and right wheels 5 (wheels) aligned side by side in the vehicle width direction, a power distributing mechanism 3 (differential mechanism) that applies a torque difference to the left and right wheels 5, and a pair of motors 2 connected to the power distributing mechanism 3. In the drawings illustrating the embodiment, alphabets R and L which are attached to the numerical signs represent the arrangement positions of the elements related to the signs (i.e., the positions on the right side and the left side of the vehicle 1). For example, the reference sign 5L represents one (left wheel) of the left and right wheels 5 located on the left side of the vehicle 1, and the reference sign 5R represents the other (right wheel) located on the right side. The left and right wheels 5 may be positioned anywhere in the front-rear direction and may be front wheels or rear wheels of the vehicle 1.

Each motor 2 (driving source) has a function of driving at least either one of the front wheels and the rear wheels of the vehicle 1, and can have a function of driving all four wheels. Of the pair of motors 2, one arranged on the left side is a left motor 2L (left driving source), and the other arranged on the right side is a right motor 2R (right driving source). The left motor 2L and the right motor 2R operate independently of each other, and may individually output driving forces having different magnitudes from each other. These motors 2 are connected to the power distributing mechanism 3 each via a pair of reduction mechanisms provided separately from each other.

The vehicle 1 includes the power distributing mechanism 3 that amplifies the torque difference between the pair of motors 2 and distributes the torque difference to each of left and right wheels 5. The power distributing mechanism 3 of the present embodiment is a differential mechanism having a yaw control function (AYC (Active Yaw Control) function), and is interposed between an axle 4 (left axle 4L)

connected to the left wheel 5L and an axle 4 (right axle 4R) connected to the right wheel 5R. The yaw control function is a function that adjusts the yaw moment by actively controlling the sharing ratio of the driving forces (driving torques) of the left and right wheels 5 and stabilizes the posture of the vehicle 1. Inside the power distributing mechanism 3, a planetary gear mechanism and a differential gear mechanism are incorporated, for example. A vehicle driving device including the pair of motors 2 and the power distributing mechanism 3 is also referred to as a DM-AYC (Dual Motor AYC) device.

Figure 2:
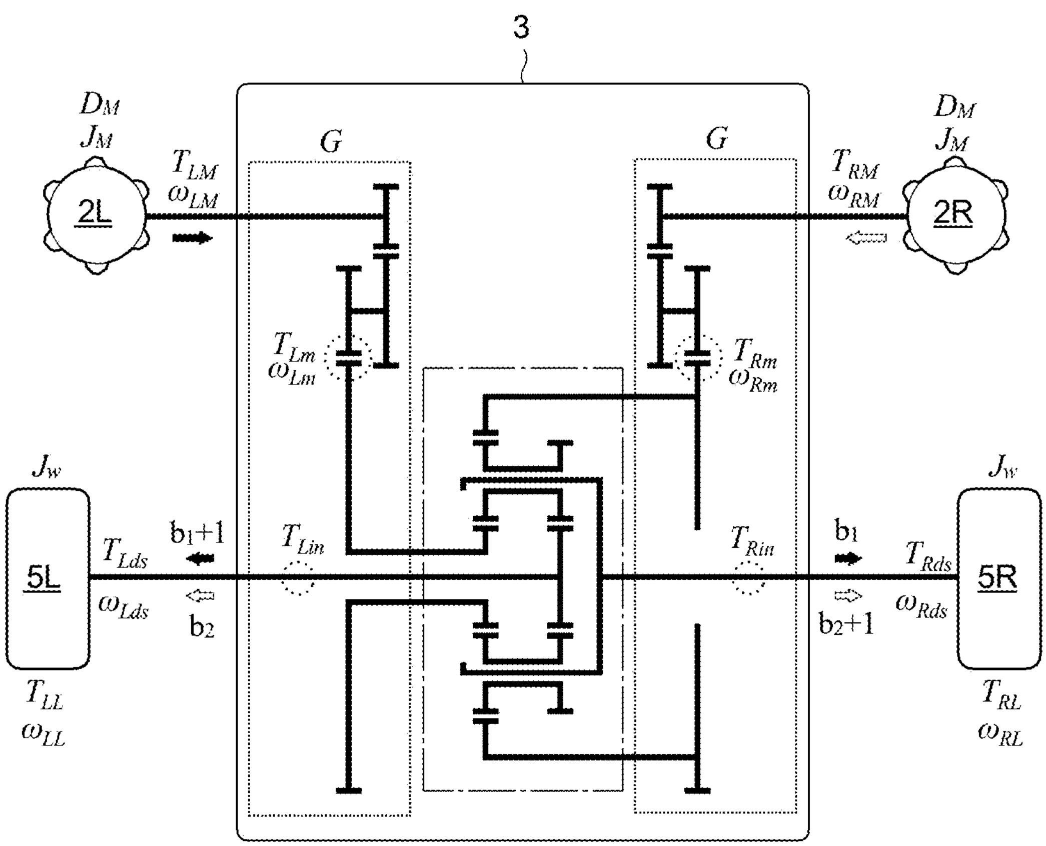
FIG. 2 is a skeleton diagram showing an example of a configuration of a driving system of the vehicle.

As shown in FIG. 2, the power distributing mechanism 3 includes the pair of reduction mechanisms (gear trains surrounded by dashed lines in FIG. 2) that reduces the rotational speeds of the motors 2 and a transmission mechanism (gear trains surrounded by one-dot dashed lines in FIG. 2). Each reduction mechanism is a mechanism that increases the torque by reducing the speed of the corresponding motor 2. The reduction ratio G of the reduction mechanism is appropriately set according to the output characteristic and the performance of the motor 2. If the torque performances of the motors 2 are sufficiently high, the reduction mechanisms may be omitted. The transmission mechanism is a mechanism that amplifies the difference between torques transmitted to the left and right wheels 5.

The transmission mechanism of the power distributing mechanism 3 shown in FIG. 2 includes a pair of planetary gear mechanisms. These planetary gear mechanisms have a structure in which the rotation shafts of planetary gears provided on respective carriers are connected to each other. Each carrier supports the planetary gears such that the planetary gears can rotate and revolve between a sun gear and a ring gear. Further, the driving forces transmitted from the left and right motors 2 are inputted into the ring gear and the sun gear of one of the planetary gear mechanisms. The driving forces transmitted to the left and right wheels 5 are taken out from the sun gear and the carrier of the other planetary gear mechanism. Note that the structure of the power distributing mechanism 3 shown in FIG. 2 is merely exemplary for achieving the yaw control function, and can be replaced with another known structure.

In FIG. 2, the symbol $J_M$ represents motor inertia (moment of inertia of the motors 2), the symbol $D_M$ represents a motor viscosity (viscosity of the motor 2), and the symbol $J_w$ represents wheel inertia (moment of inertia of the left and right wheels 5). Also, in relation to the parameters of a left driving system, the symbol $T_{LM}$ represents a left-motor input torque (left-motor instruction torque), the symbol $T_{Lm}$ represents a left-motor input torque reduced by the reduction mechanism, the symbol $\omega_{LM}$ represents a left-motor angular speed, the symbol $\omega_{Lm}$ represents a left-motor angular speed reduced by the reduction mechanism, the symbol $T_{Lin}$ represents a left driving-side torque, the symbol $T_{Lds}$ represents a left-axle torque, the symbol $T_{LL}$ represents a left-wheel load-side torque, the symbol $\omega_{Lds}$ represents a left driving-side angular speed, and the symbol $\omega_{LL}$ represents a left-wheel angular speed. Similarly, in relation to the parameters of a right driving system, the symbol $T_{RM}$ represents a right-motor input torque (right-motor instruction torque), the symbol $T_{Rm}$ represents a right-motor input torque reduced by the reduction mechanism, the symbol $\omega_{RM}$ represents a right-motor angular speed, the symbol $\omega_{Rm}$ represents a right-motor angular speed reduced by the reduction mechanism, the symbol $T_{Rin}$ represents a right driving-side torque, the symbol $T_{Rds}$ represents a right-axle torque, the symbol TRL represents a right-wheel load-side torque, the symbol $\omega_{Rds}$ represents a right driving-side angular speed, and the symbol $\omega_{RL}$ represents a right-wheel angular speed.

Figure 3:
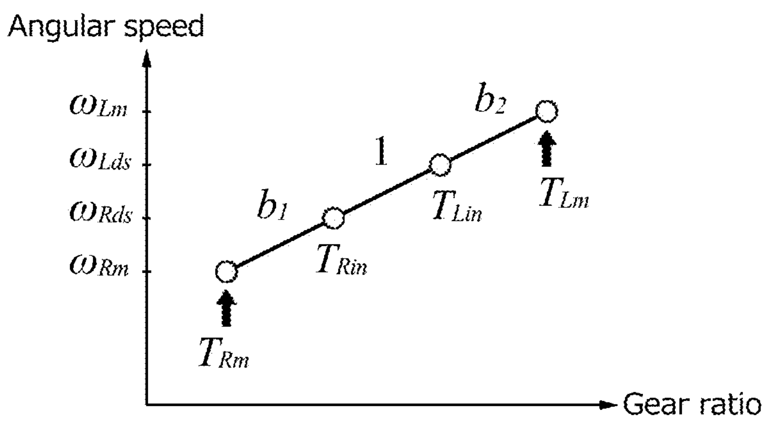
FIG. 3 is a speed graph of a power distributing mechanism of the vehicle having the configuration of FIG. 2.

FIG. 3 is a speed graph of the power distributing mechanism 3. The symbols $b_1$, $b_2$ shown in FIGS. 2 and 3 represent torque difference amplification ratios (reduction ratios, differential reduction ratios) determined according to the configuration of the gears incorporated in the power distributing mechanism 3. The torque difference amplification ratio related to motion power transmission from the left motor 2L to the right wheel 5R is represented by $b_1$ and the torque difference amplification ratio related to motion power transmission from the left motor 2L to the left wheel 5L is represented by $b_1+1$. In addition, the torque difference amplification ratio related to motion power transmission from the right motor 2R to the left wheel 5L is represented by $b_2$ and the torque difference amplification ratio related to motion power transmission from the right motor 2R to the right wheel 5R is represented by $b_2+1$.

As shown in FIG. 1, the pair of motors 2 are electrically connected to a battery 7 via respective inverters 6 (6L, 6R). Each inverter 6 is a converter (DC-AC inverter) that mutually converts the power (DC power) of a DC circuit on the side of the battery 7 and the power (AC power) of the AC circuits on the side of the motors 2. The battery 7 is, for example, a lithium-ion secondary battery or a nickel-metal hydride secondary battery, and is a secondary battery capable of supplying a high-voltage DC current of several hundred volts. While the motors 2 are power running, the DC power is converted into AC power by the inverters 6 and the converted AC power is then supplied to the motors 2. At the time of power generation of the motors 2, the generated electric power is converted into DC power by the inverters 6 and is charged into the battery 7. The operating status of each inverter 6 is controlled by the control device 10.

The control device 10 is one of electronic control units (ECUs) mounted on the vehicle 1. The control device 10 has a function of controlling outputs of the left motor 2L (left driving source) and the right motor 2R (right driving source) in the vehicle 1 provided with the left driving system including the left axle 4L and the left wheel 5L to which motion power from the left motor 2L is transmitted and the right driving system including the right axle 4R and the right wheel 5R to which motion power from the right motor 2R is transmitted.

The control device 10 includes a processor (central processing unit), a memory (main memory), a storage device (storage), an interface device, and the like, which do not appear in the drawings, and these elements are communicably coupled to each other via an internal bus. The contents of the determination and the control performed by the control device 10 are recorded and stored as firmware or an application program in the memory, and when the program is to be executed, the contents of the program are expanded in a memory space and executed by the processor.

To the control device 10, an accelerator position sensor 14, a brake sensor 15, a steering sensor 16, resolvers 17, and wheel speed sensors 18 are connected. The accelerator position sensor 14 is a sensor that detects the amount (accelerator opening) of depressing of the accelerator pedal and the depression speed. The brake sensor 15 is a sensor that detects the amount (brake pedal stroke) of depressing of the brake pedal and the depression speed. The steering sensor 16 is a sensor that detects a steering angle (actual steering angle or steering angle of the steering wheel) of the left and right wheels 5.

The resolvers 24 (24L, 24R) are sensors (detectors) that detect the actual angular speeds of the motors 2 and are provided one for each of the pair of motors 2. Each resolver 24 outputs data of a rotational angle of the motor 2 in the form of a two-phase AC voltage. The actual angular speed of the motor 2 is grasped from the chronological change of the AC voltage. The wheel speed sensors 25 (25L, 25R) are sensors (detectors) that detect the angular speeds of the axles 4. The control device 10 controls the operating status of the inverters 6 (6L, 6R) on the basis of the information detected by the above sensors 21 to 25 and thereby controls the outputs of the pair of motors 2 (2L, 2R). The actual angular speed of the motors 2 may be detected by using other sensors (e.g., detectors such as hall sensors and encoders) different in internal structure and operation principle instead of the resolvers 24.

The vehicle 1 is provided with a detector that detects an actual speed (hereinafter referred to a "left actual speed") of the left driving system or the left motor 2L and an actual speed (hereinafter referred to as a "right actual speed") of the right driving system or the right motor 2R. Examples of the actual speed here include an actual angular speed of the axle 4, an actual angular speed or an actual wheel speed of the left or right wheel 5, an actual angular speed of the motor 2, and an angular speed (decelerated angular speed) after the actual angular speed of the motor 2 is decelerated by the reduction mechanism. The detector is a device or a sensor capable of detecting an actual speed, and is exemplified by the resolvers 24 or the wheel speed sensors 25 described above.

2. Control Device

FIG. 4 is a block diagram showing a control (vibration suppressing control that uses a control method as the embodiment) performed in the control device 10. In this control, vibrations of the left driving system and the right driving system are separated into a vibration while the vehicle 1 is running straight and a vibration while the vehicle 1 is cornering, and the former is isolated as a vibration of a sum mode and the latter is isolated as a vibration of a difference mode. Then, a torque for suppressing the vibration is obtained in each of the sum mode and the difference mode, and the obtained torques are returned to the left and right expressions, and then outputted (instructed) to the left motor 2L and the right motor 2R.

The storage device of the control device 10 of the present embodiment stores two sum models used in the sum mode and two difference models used in the difference mode. In other words, the vehicle control method of the present embodiment firstly prepares the sum models and the difference models. Each of the sum models is a model that models motion states of the left driving system and the right driving system while the vehicle 1 is running straight, and each of the difference models is a model that models motion states of the left driving system and the right driving system while the vehicle 1 is cornering. The sum models and the difference models are models related to the vibration suppression.

Generally, the vehicle 1 generates different vibrations between a running-straight state and a cornering state, and the resonant frequencies in these states are also different from each other. As an example, although the resonant frequency varies depending on the type of the vehicle 1, the resonant frequency is about 6 Hz while the vehicle 1 is running straight, whereas the resonant frequency is smaller than this, for example, about 2 Hz while the vehicle 1 is cornering. As described above, in order to effectively suppress vibrations that are different depending on whether the traveling state of the vehicle 1 is the running-straight state (translational motion) or the cornering state (yaw motion) and to prevent the controls (outputs) for vibration suppression from interfering with each other on the left and right sides, the control (output) is separated into the above two modes and two types of models used one in each of the modes are provided. That is, for a resonant frequency which is different between the running-straight state and the cornering state, the sum model and the difference model are ones that activate vibration suppressing control under the respective running-straight and cornering states.

Further, this control is a cooperative control that combines a feed-forward control (hereinafter referred to as "FF control") and a feed-back control (hereinafter referred to as "FB control"), and exhibits a higher vibration suppressing effect. The FF control outputs instruction torques (hereinafter referred to as "first instruction torques") to control the left motor 2L and the right motor 2R on the basis of a left requested torque being a requested torque to the left driving system or the left motor 2L and a right requested torque being a requested torque to the right driving system or the right motor 2R. The first instruction torques outputted here are torque command values for suppressing vibrations of the left driving system (mainly, the left axle 4L) and the right driving system (mainly, the right axle 4R). In some cases, the FF control swings the motors 2 on purpose to suppress vibration of the axles 4 (so that the axle 4 does not vibrate).

The left requested torque is, for example, a requested torque $T_{Lds\text{-}ref}$ (hereinafter referred to as "left-axle requested torque $T_{Lds\text{-}ref}$") to the left axle 4L. The right requested torque is, for example, a requested torque $T_{Rds\text{-}ref}$ (hereinafter, referred to as "right-axle requested torque $T_{Rds\text{-}ref}$") to the right axle 4R. This embodiment illustrates a case where these axle requested torques $T_{Lds\text{-}ref}$ and $T_{Rds\text{-}ref}$ are used as the left requested torque and the right requested torque.

In contrast, the FB control suppresses vibration of the motors 2 regardless of the vibration of the axles 4, and consequently, aims at further suppressing the vibration by removing vibration components that the FF control has not removed. However, the FF control sometimes swings (vibrates) the motors 2 on purpose so that the axles 4 do not vibrate as described above. In adopting the above FF control, if the FB control is carried out regardless of the FF control, the FF control and the FB control interfere with each other and the vibration components that the FF control has generated intentionally may be removed.

As a solution to the above, the FB control of the present control outputs instruction torques (hereinafter referred to as "second instruction torques") to control the left motor 2L and the right motor 2R on the basis of gaps between each of the speeds (angular speeds) and the actual speed of each of the motors 2, which the speeds estimated on the basis of the outputs (i.e., the first instruction torques) of the FF control. The second instruction torques outputted here are torque command values for removing vibration components that the FF control has not removed. Then, the outputs of the left motor 2L and the right motor 2R are controlled with the first instruction torques obtained by the FF control and the second instruction torques obtained by the FB control. This means that, by using the results (outputs) of the FF control in the FB control, the vibration components that the FF control generates on purpose are set not to be removed.

The estimation of the speeds based on the outputs of the FF control uses the above-mentioned sum model and difference model. Hereinafter, the sum model and the difference model used in the estimation are referred to as a first sum model and a first difference model. In addition, the above-described sum model and difference model are also used in each of the FF control and the FB control. Hereinafter, a sum model and a difference model used in the FF control are referred to as a second sum model and a second difference model, respectively, and a sum model and a difference model used in the FB control are referred to as a third sum model and a third difference model, respectively.

As shown in FIG. 4, the second sum model is applied with a first equivalent sum value (e.g., a sum requested torque $T_{Sds\text{-}ref}$) to output (derive) a first sum instruction torque $T_{Sin}$ for controlling the motors 2 while the vehicle 1 is running straight (specifically, for suppressing vibrations of the left driving system and the right driving system). In addition, the second difference model is applied with a first equivalent difference value (e.g., a difference requested torque $T_{Dds\text{-}ref}$) to output (derive) a first difference instruction torque $T_{Din}$ for controlling the motors 2 while the vehicle 1 is cornering (specifically, for suppressing vibrations of the left driving system and the right driving system). The first equivalent sum value is a generic term for a value corresponding to the sum of the left requested torque and the right requested torque. The first equivalent sum value is not only a simple sum but also a product of the sum and a predetermined coefficient or half the sum (arithmetic mean value). In addition, the first equivalent difference value is a generic term for a value corresponding to the difference between the left requested torque and the right requested torque. The first equivalent difference value may be not only a simple difference but also a product of the difference and a predetermined coefficient.

Step A1 in FIG. 4 corresponds to a step (converting step) of calculating the first equivalent sum value corresponding to the sum of the left requested torque and the right requested torque. The first equivalent sum value calculated in this step is applied to the second sum model in Step A2 in FIG. 4. In the second sum model, the FF control is performed and consequently obtains the above first sum instruction torque $T_{Sin}$. In Step A1 in FIG. 4, also the first equivalent difference value corresponding to the difference between the left requested torque and the right requested torque is calculated. The first equivalent difference value calculated in this step is applied to the second difference model in Step A3 in FIG. 4. Also in the second difference model, the FF control is performed and consequently obtains the first difference instruction torque $T_{Din}$.

Step B1 in FIG. 4 corresponds to a step (converting step) of calculating a second equivalent sum value $\omega_{SM}$ corresponding to the sum of the left actual speed and the right actual speed (for example, the sum of two actual angular speeds $\omega_{LM}$ and $\omega_{RM}$). The second equivalent sum value $\omega_{SM}$ is a generic term for a value corresponding to the sum of the left actual speed (e.g., actual angular speed $\omega_{LM}$ of the left motor 2L) and the right actual speed (e.g., the actual angular speed $\omega_{RM}$ of the right motor 2R), and is also referred to as a "sum motor angular speed $\omega_{SM}$". The second equivalent sum value $\omega_{SM}$ is not only a simple sum but also a product of the sum and a predetermined coefficient or half the sum (arithmetic mean value). The second equivalent sum value $\omega_{SM}$ calculated in this step is applied to the third sum model in Step B2 in FIG. 4.

Further, in Step B1 in FIG. 4, also a second equivalent difference value $\omega_{DM}$ corresponding to the difference between the left actual speed and the right actual speed (for example, a difference between two actual angular speeds $\omega_{LM}$ and $\omega_{RM}$) are calculated. The second equivalent difference value $\omega_{DM}$ is a generic term for a value corresponding to the difference between the left actual speed (e.g., actual angular speed $\omega_{LM}$ of the left motor 2L) and the right actual speed (e.g., the actual angular speed $\omega_{RM}$ of the right motor 2R), and is also referred to as a "difference motor angular speed $\omega_{DM}$". The second equivalent difference value $\omega_{DM}$ is not only a simple difference but also a product of the difference and a predetermined coefficient. The second equivalent difference value $\omega_{DM}$ calculated in this step is applied to the third difference model in Step B3 in FIG. 4.

By being applied with the first instruction torque (specifically, the first sum instruction toque $T_{Sin}$ outputted from the second sum model), the first sum model outputs (derives) an estimated sum speed (e.g., estimated sum angular speed $\omega_{Ses}$) corresponding to the sum of an estimated speed (e.g., estimated angular speed) of the left motor 2L and an estimated speed (e.g., estimated angular speed) of the right motor 2R. Further, by being applied with the first instruction torque (specifically, first difference instruction torque $T_{Din}$ outputted from the second difference model), the first difference model outputs (derives) an estimated difference speed (e.g., an estimated difference angular speed (Des) corresponding to the difference between the estimated speed of the left motor 2L and the estimated speed of the right motor 2R.

In Step C1 of FIG. 4, an estimated sum speed (e.g., estimated sum angular speed $\omega_{Ses}$) is derived (estimated) on the basis of the first sum instruction torque $T_{Sin}$. Further, in Step C2 of FIG. 4, the estimated difference speed (e.g., estimated difference angular speed $\omega_{Des}$) is derived (estimated) on the basis of the first difference instruction torque $T_{Din}$. The estimated speed of the left motor 2L and the estimated speed of the right motor 2R themselves are not estimated in Steps C1 and C2, but the estimated sum speed is estimated from the first sum instruction torque $T_{Sin}$ and the estimated difference speed is estimated from the first difference instruction torque $T_{Din}$. The estimated sum speed estimated here is applied to the third sum model in Step B2 in FIG. 4, and the estimated difference speed is applied to the third difference model in Step B3 in FIG. 4. Hereinafter, description will now be made in relation to a case where the estimated sum angular speed $\omega_{Ses}$ is estimated as the estimated sum speed and the estimated difference angular speed $\omega_{Des}$ is estimated as the estimated difference speed.

The third sum model is applied with the second equivalent sum value $\omega_{SM}$ and the estimated sum angular speed $\omega_{Ses}$ to output (derive) a second sum instruction torque $T_{SV}$ for controlling the motors 2 while the vehicle 1 is running straight (specifically, for suppressing vibrations of the left driving system and the right driving system). In the third sum model, the FB control based on the gap between the estimated sum angular speed $\omega_{Ses}$ and the second equivalent sum value $\omega_{SM}$ is performed, and consequently the second sum instruction torque $T_{SV}$ is obtained. Similarly, the third difference model is applied with the second equivalent difference value $\omega_{DM}$ and the estimated difference angular speed $\omega_{Des}$ to output (derive) a second difference instruction torque $T_{DV}$ for controlling the motors 2 while the vehicle 1 is cornering (specifically, for suppressing vibrations of the left driving system and the right driving system). In the third difference model, the FB control based on the gap between the estimated difference angular speed $\omega_{Des}$ and the second equivalent difference value $\omega_{DM}$ is performed, and the second difference instruction torque $T_{DV}$ is acquired.

Step D1 of FIG. 4 is an inverse converting step of changing the sum and difference expressions (running straight and cornering) to the left and right expressions. Into Step D1, a sum value (hereinafter referred to as "total sum torque") of the first sum instruction torque $T_{Sin}$ outputted from the second sum model and the second sum instruction torque $T_{SV}$ outputted from the third sum model is inputted and also a sum value (hereinafter referred to as "total difference torque") of the first difference instruction torque $T_{Din}$ outputted form the second difference model and the second difference instruction toque $T_{Dv}$ outputted from the third difference model is inputted. This means that, in Step D1, a left instruction torque $T_{LM}$ to be outputted to the left motor 2L and a right instruction torque $T_{RM}$ to be outputted to the right motor 2R are calculated from the total sum torque obtained from the two sum models and the total difference torque obtained from the two difference models.

As the above, the vibration suppressing control of the present embodiment separates the sum mode and the difference mode in the FF control and the FB control, and uses the sum models and the difference models independent of each other in the respective modes. This can easily provide different characteristics to the first sum instruction torque $T_{Sin}$ and the second sum instruction torque $T_{SV}$ for suppressing the vibration while the vehicle is running straight and the first difference instruction torque $T_{Din}$ and the second difference instruction torque $T_{DV}$ for suppressing the vibration while cornering.

Next, description will now be made in relation to a specific configuration to perform the above-described control. As shown in FIG. 1, the control device 10 includes a first calculator 11, a storing unit 12, a first controller 13, an estimator 14, a second calculator 15, a second controller 16, and a third controller 17. These elements are obtained by classifying the functions of the control device 10 for convenience. These elements may be described as independent programs for implementing the functions of the respective elements. Alternatively, these elements may be described as a combined program of multiple elements being combined.

The first calculator 11 calculates the above first equivalent sum value and first equivalent difference value. The first calculator 11 of the present embodiment calculates the requested torque to the left driving system or the left motor 2L as the "left requested torque" and the requested torque to the right driving system or the right motor 2R as the "right requested torque" based on the driver operation (for example, the accelerator operation, the brake operation, the steering operation). Then, the first calculator 11 calculates the first equivalent sum value and the equivalent difference value based on the left requested torque (e.g., left-axle requested torque $T_{Lds\text{-}ref}$) and the counterpart right requested torque (e.g., right-axle requested torque $T_{Dds\text{-}ref}$). Here, the left requested torque and the right requested torque may be calculated by calculating means different from the first calculator 11, or may be calculated by an electronic control unit (for example, a superordinate ECU of the control device 10) different from the control device 10. The manner of calculating these requested torques is not particularly limited, and may be calculated based on, for example, vehicle speed information in addition to the above-described driver operation.

This embodiment illustrates a case where the sum requested torque $T_{Sds\text{-}ref}$ is obtained as the first equivalent sum value, and the difference requested torque $T_{Dds\text{-}ref}$ is obtained as the first equivalent difference value. The following calculation equations are used when the half of the sum of the left-axle requested torque $T_{Lds\text{-}ref}$ and the right-axle requested torque $T_{Rds\text{-}ref}$ is defined as the first equivalent sum value and the half of the difference between the left-axle requested torque $T_{Lds\text{-}ref}$ and the right-axle requested torque $T_{Rds\text{-}ref}$ is defined as the first equivalent difference value.

[Math 1]

$$\begin{pmatrix} T_{Sds-ref} \\ T_{Dds-ref} \end{pmatrix} = \begin{pmatrix} \frac{1}{2} & \frac{1}{2} \\ \frac{1}{2} & -\frac{1}{2} \end{pmatrix} \begin{pmatrix} T_{Rds-ref} \\ T_{Lds-ref} \end{pmatrix}$$

$$\begin{pmatrix} \omega_{SL-ref} \\ \omega_{DL-ref} \end{pmatrix} = \begin{pmatrix} \frac{1}{2} & \frac{1}{2} \\ \frac{1}{2} & -\frac{1}{2} \end{pmatrix} \begin{pmatrix} \omega_{RL-ref} \\ \omega_{LL-ref} \end{pmatrix}$$

The storing unit 12 stores the above models (e.g., first sum model 26, second sum model 30, first difference model 27, second difference model 40, third sum model 50, and third difference model 60) used in the sum mode and the difference mode. The models 26, 27, 30, 40, 50, and 60 are examples. Here, in describing the first sum model 26 and the second sum model 30, and in describing the first difference model 27 and the second difference model 40, the schematic structures of the left driving system and the right driving system of the vehicle 1 will be firstly described, and then the third sum model 50 and third difference model 60 will be described.

Figure 5:
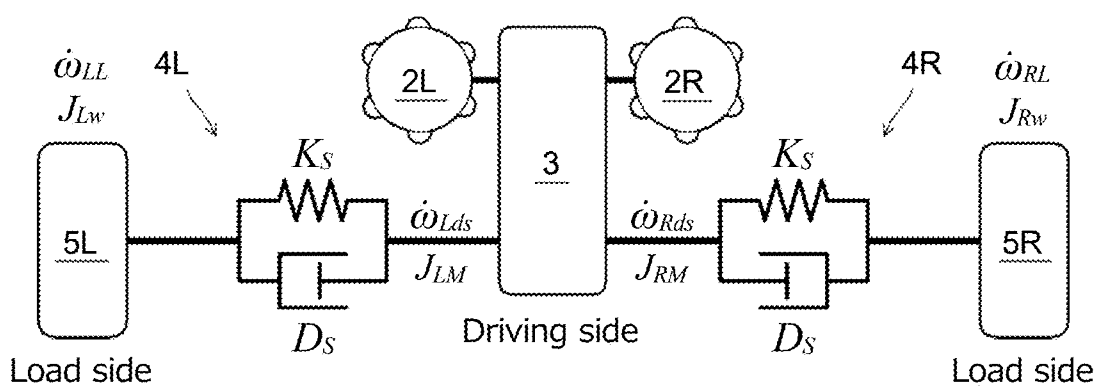
FIG. 5 is a schematic diagram schematically showing configurations of a left driving system and a right driving system of the vehicle.

FIG. 5 is a schematic diagram of the configurations of the left driving system and the right driving system of the vehicle 1. Each of the left axle 4L and the right axle 4R can be regarded as a structure in which a spring (axle stiffness $K_s$) and a damper (axle viscosity $D_s$) are connected in parallel. In FIG. 5, the symbol $J_{LM}$ represents inertia of the side of the power distributing mechanism 3 (driving side) against the left axle 4L, the symbol $J_{Lw}$ represents inertia of the side of the left wheel 5L (load side) against the left axle 4L, the symbol $J_{RM}$ represents inertia of the side of the power distributing mechanism 3 (driving side) against the right axle 4R, and the symbol $J_{Rw}$ is inertia of the side of the right wheel 5R (load side) against the right axle 4R. FIG. 5 also shows a differential value (left driving-side angular acceleration) of the left driving-side angular speed $\omega_{Lds}$, a differential value (left-wheel angular acceleration) of the left-wheel angular speed $\omega_{LL}$, a differential value (right driving-side angular acceleration) of the right driving-side angular speed $\omega_{Rds}$, and a differential value (right-wheel angular acceleration) of the right-wheel angular speed $\omega_{RL}$.

Figure 6A:
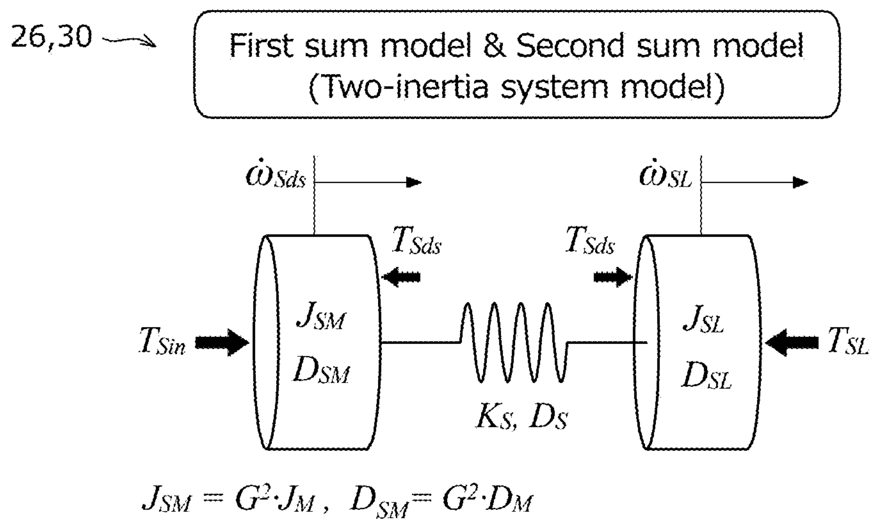
FIG. 6A is a schematic diagram of a first sum model and a second sum model.
Figure 6B:
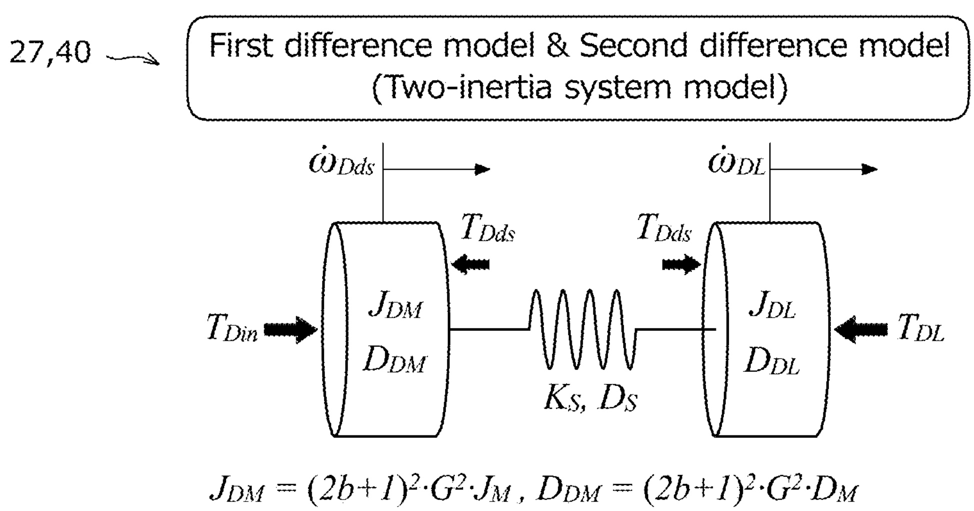
FIG. 6B is a schematic diagram of a first difference model and a second difference model.

On the basis of the above schematic diagram, the configurations of the first sum model 26 and the second sum model 30 are modeled to have the configurations shown in FIG. 6A, and the configurations of the first difference model 27 and the second difference model 40 are modeled to have the configurations shown in FIG. 6B. The first sum model 26 is used for estimating a speed (e.g., angular speed) while the vehicle 1 is running straight, and the first difference model 27 is used for estimating a speed (e.g., angular speed) while the vehicle 1 is cornering. The second sum model 30 is applied to vibration suppressing control on the axles 4 and the left and right wheels 5 related to the running-straight state of the vehicle 1, and the second difference model 40 is applied to vibration suppressing control on the axles 4 and the left and right wheels 5 related to the cornering state of the vehicle 1.

This embodiment gives the second sum model 30 a characteristic that is unlikely to generate the resonance during the running-straight state (a characteristic not containing a resonant frequency component during the running-straight state), and the second difference model 40 a characteristic that is unlikely to generate the resonance during the cornering state (a characteristic not containing a resonant frequency component during the cornering state). As the above, control with resonance frequencies different between the sum model and the difference model makes it possible to suppress vibrations in all driving states. In this embodiment, each of the first sum model 26, the first difference model 27, the second sum model 30, and the second difference model 40 is a two-inertia system model, but each may alternatively be configured as a multi-inertia system model including three or more moments of inertia and/or spring dampers.

As shown in FIG. 6A, the first sum model 26 and the second sum model 30 each include driving-side inertia $J_{SM}$, a spring damper designed with a stiffness $K_s$ and a viscosity $D_s$, and load-side inertia (sum-mode wheel nominal inertia) $J_{SL}$. The driving-side inertia $J_{SM}$ is calculated based on the inertia $J_M$ of the driving sources (left driving source and right driving source), and is, for example, expressed by the equation $J_{SM}=G^2J_M$. The load-side inertia $J_{SL}$ is calculated based on a vehicle body weight M (calibrated in terms of a wheel).

In addition to the drive-side inertia $J_{SM}$ and the load-side inertia $J_{SL}$, the sum model may further consider a drive-side viscosity $D_{SM}$ and a load-side viscosity DSL. The drive-side viscosity $D_{SM}$ is calculated on the basis of the viscosity $D_M$ of the driving sources (left driving source and right driving source), and is, for example, $D_{SM}=G^2D_M$. In FIG. 6A, the symbol $T_{Sin}$ represents a first sum instruction torque (sum-mode driving-side torque), the symbol $T_{Sds}$ represents a sum-mode axle torque, the symbol $T_{SL}$ represents a sum-mode wheel load-side torque, the symbol $\omega_{Sds}$ represents a sum-mode driving-side angular speed, and the symbol $\omega_{SL}$ represents a sum-mode wheel angular speed. The first sum model 26 and the second sum model 30 may be each expressed by a relational expression including a transfer function representing the input/output characteristic of the two-inertia system. The equations of motion of the first sum model 26 and the second sum model 30 are shown below.

Equation of motion of driving side $$J_{SM}\dot{\omega}_{Sds} = T_{Sin} - T_{Sds} \qquad \text{[Math 2]}$$

Equation of motion of load side $$J_{SL}\dot{\omega}_{SL} = T_{Sds} - T_{SL}$$

Equation of motion of spring dumper system $$T_{Sds} = K_S\int(\omega_{Sds} - \omega_{SL}) + D_S(\omega_{Sds} - \omega_{SL})$$

As shown in FIG. 6B, the first difference model 27 and the second difference model 40 each include driving-side inertia $J_{DM}$ corresponding to equivalent inertia when a left-right difference is generated (i.e., while the vehicle 1 is cornering), the spring damper designed with the stiffness $K_s$ and the viscosity $D_s$, and load-side inertia (difference-mode wheel nominal inertia) $J_{DL}$. The driving-side inertia $J_{DM}$ is calculated based on the inertia $J_M$ of the driving sources (left driving source and right driving source) and the torque difference amplification ratios (e.g., $b_1$, $b_2$) of the power distributing mechanism 3, and is, for example, expressed by the equation $J_{DM}=(2b_1+1)^2G^2J_M$. The load-side inertia $J_{DL}$ is calculated based on the yaw inertia (calibrated in terms of a wheel) of the vehicle 1.

In addition to the drive-side inertia $J_{DM}$ and the load-side inertia $J_{DL}$, the difference model may further consider a drive-side viscosity $D_{DM}$ and a load-side viscosity $D_{DL}$. The drive-side viscosity $D_{DM}$ is calculated on the basis of the viscosity $D_M$ and torque difference amplification ratios (e.g., $b_1$, $b_2$) of the driving sources (left driving source and right driving source), and is, for example, $D_{DM}=(2b_1+1)^2G_2D_M$. In FIG. 6B, the symbol $T_{Din}$ represents the first difference instruction torque (difference-mode driving-side torque), the symbol $T_{Dds}$ represents a difference-mode axle torque, the symbol $T_{DL}$ represents a difference-mode wheel load-side torque, the symbol $\omega_{Dds}$ represents a difference-mode driving-side angular speed, and the symbol $\omega_{DL}$ represents a difference-mode motor angular speed. The first difference model 27 and the second difference model 40 may also be expressed by a relational expression including a transfer function representing the input/output characteristic of the two-inertia system. The equations of motion of the first difference model 27 and the second difference model 40 are shown below.

$$\text{Equation of motion of driving side } J_{DM}\dot{\omega}_{Dds} = T_{Din} - T_{Dds} \qquad \text{[Math 3]}$$

$$\text{Equation of motion of load side } J_{DL}\dot{\omega}_{DL} = T_{Dds} - T_{DL}$$

$$\text{Equation of motion of spring dumper system } T_{Dds} = K_S\int(\omega_{Dds} - \omega_{DL}) + D_S(\omega_{Dds} - \omega_{DL})$$

$$\textit{Equation of motion of driving side } J_{DM}\dot{\omega}_{Dds} = T_{Din} - T_{Dds}$$

Figure 7:
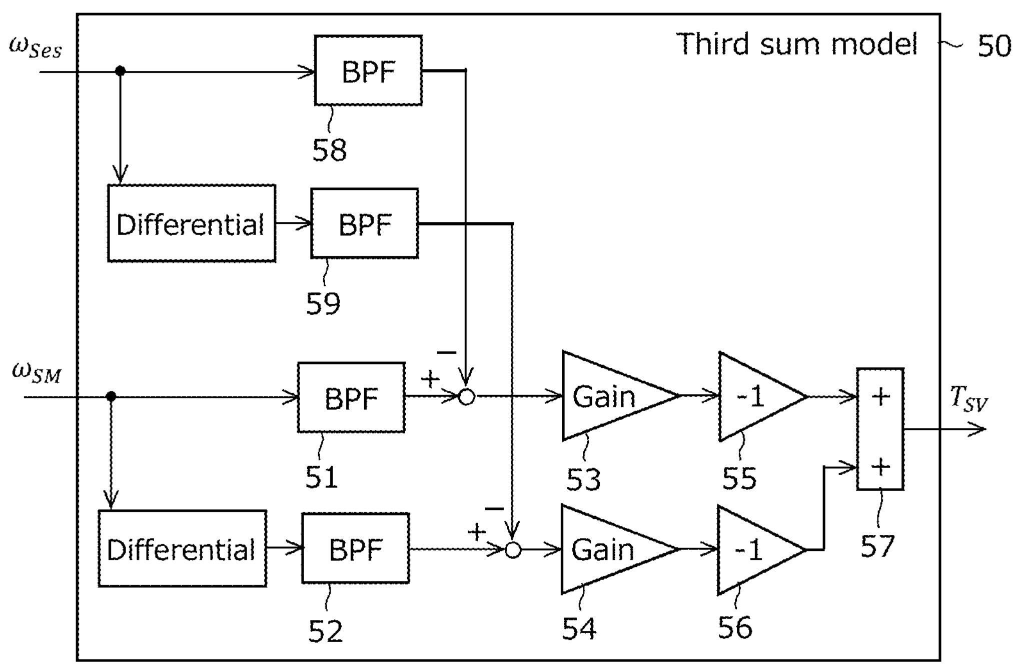
FIG. 7 is a diagram showing an example of a third sum model of FIG. 4.
Figure 8:
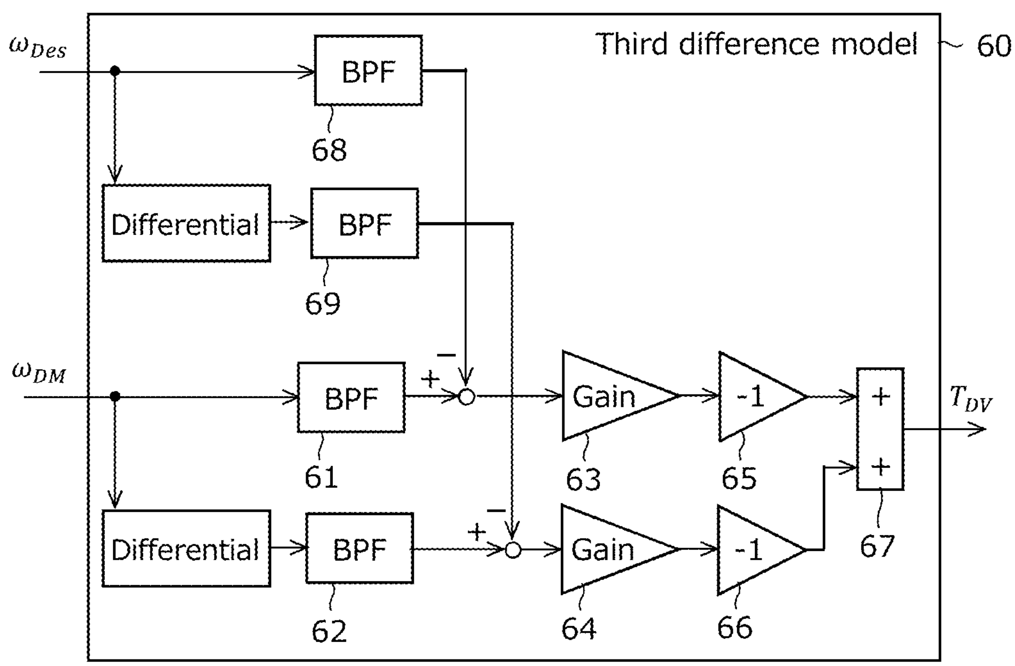
FIG. 8 is a diagram showing an example of a third difference model of FIG. 4.

FIG. 7 and FIG. 8 are diagrams showing examples of the third sum model 50 and the third difference model 60 of this embodiment. The third sum model 50 and the third difference model 60 each include a band-pass filter (hereinafter, referred to as "BPF") that extracts a vibration component. A BPF is used to extract a resonant frequency component serving as a vibration component to be suppressed, and resonant components each to be extracted are determined by the BPF of the third sum model 50 and the BPF of the third difference model 60.

As shown in FIG. 7, the third sum model 50 includes BPF 51 and 52 that extract sum-mode frequency bands in a first predetermined range including a resonant frequency $RF_S$ of the left and right drive systems while the vehicle 1 is running straight. The first predetermined range is, for example, a range of +1 Hz of the resonant frequency $RF_S$ (i.e., equal to or larger than "$RF_S-1$" and equal to or smaller than "$RF_S+1$"). For example, assuming that the resonant frequency $RF_S$ while the vehicle 1 is running straight is 6 Hz, the sum-mode frequency band in the first predetermined range is 5 Hz to 7 Hz.

The third sum model 50 is provided with the BPF 51 that extracts a vibration component from the second equivalent sum value $\omega_{SM}$ and the BPF 52 that extracts a vibration component from a differential value of the second equivalent sum value $\omega_{SM}$. The sum-mode frequency bands of the two BPFs 51 and 52 may be the same or different from each other. Furthermore, the third sum model 50 is provided with a BPF 58 that extracts a predetermined vibration component from the estimated sum angular speed $\omega_{Ses}$ estimated by the estimator 14 and a BPF 59 that extracts a predetermined vibration component from the differential value of the estimated sum angular speed $\omega_{Ses}$. The frequency bands of the two BPFs 58 and 59 may be the same or different from each other.

In the third sum model 50, a gap is calculated by subtracting the vibration component extracted by the BPF 58 from the vibration component extracted by the BPF 51, and a gap is calculated by subtracting the vibration component extracted by the BPF 59 from the vibration component extracted by the BPF 52. The third sum model 50 is provided with first multipliers 53 and 54 which multiply gains for converting these gaps into torques, second multipliers 55 and 56 which convert the converted torques into the torques for suppressing vibrations, and an adder 57 which adds the two torques for suppressing vibration. This means that the third sum model 50 includes FB control consisting of P control (proportional BPF control) and D control (differential BPF control). The torque outputted from the adder 57 is the above second sum instruction torque $T_{SV}$.

The third difference model 60 shown in FIG. 8 is configured similarly to the third sum model 50. The third difference model 60 includes BPFs 61 and 62 that extract difference-mode frequency bands in a second predetermined range including resonant frequency $RF_C$ of the left and right drive systems while the vehicle 1 is cornering. Like the first predetermined range, the second predetermined range is, for example, a range of ±1 Hz of the resonant frequency $RF_C$ (i.e., equal to or larger than "$RF_C-1$" and equal to or smaller than "$RF_C+1$"). For example, assuming that the resonant frequency $RF_C$ while the vehicle 1 is cornering is 2 Hz, the sum-mode frequency band in the second predetermined range is 1 Hz to 3 Hz. The first predetermined range and the second predetermined range are not necessarily the same size.

Figure 9:
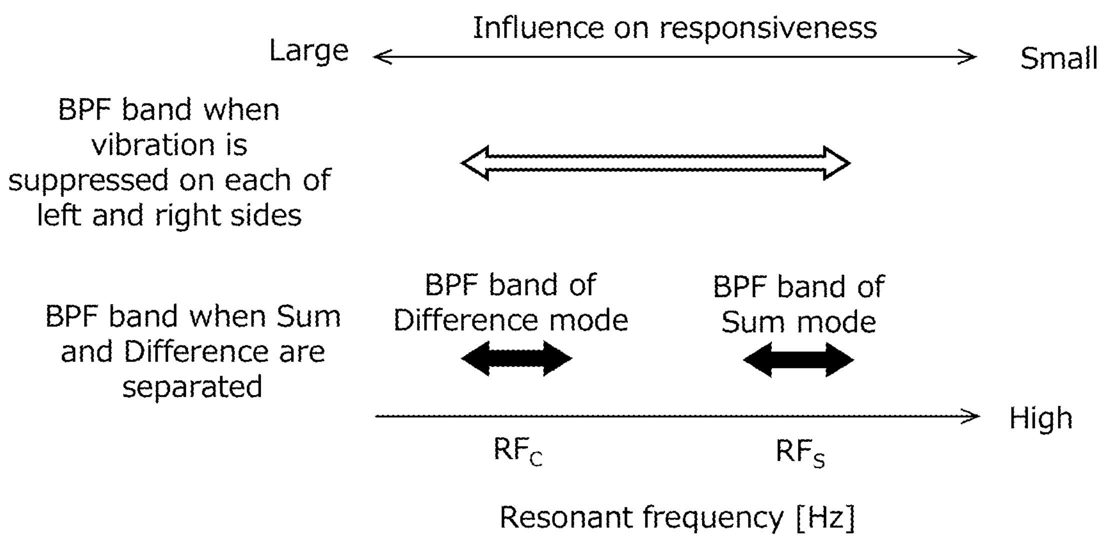
FIG. 9 is a schematic diagram showing a relationship between a frequency band of a band-pass filter and responsiveness.

As indicated by the black arrows in FIG. 9, the sum-mode frequency band (sum-mode BPF band) and the difference-mode frequency band (difference-mode BPF band) are set so as not to overlap each other. A BPF band indicated by a white arrow in FIG. 9 is a comparative example, and represents a frequency band set in a conventional vibration suppressing control, which carries out vibration suppressing control in each of the left and right sides. As indicated by the white arrow, when an attempt is made to set a BPF in order to suppress the vibration (near $RF_S$) while the vehicle is running straight and the vibration (near $RF_C$) while the vehicle is cornering, a BPF having a wide frequency band needs to be used.

Here, it is known that a lower resonant frequency more largely affects responsiveness (in particular, the acceleration responsiveness), as indicated by the horizontal axis in FIG. 9 representing "influence on responsiveness". For the above, setting a wide frequency band of a BPF as the conventional scheme has a problem that the responsiveness (in particular, the acceleration responsiveness at the time of starting or accelerating) lowers. In contrast, as indicated by the black arrows, this method, which sets the sum-mode frequency band (sum-mode BPF band) and the difference-mode frequency band (difference-mode BPF band) not to overlap each other, extracts a vibration while the vehicle 1 is running straight and a vibration while the vehicle 1 is cornering separately from each other, so that the frequency bands can be set to a minimum and the influence on the responsiveness is reduced. In addition, since the vehicle 1 is accelerated normally while running straight not cornering, setting the sum-mode frequency band for extracting the vibration while the vehicle 1 is running straight to a higher side of the resonant frequency can achieve enhancement in the acceleration responsiveness.

As shown in FIG. 8, the third difference model 60 is provided with a BPF 61 that extracts a vibration component from the second equivalent difference value $\omega_{DM}$ and a BPF 62 that extracts a vibration component from the differential value of the second equivalent difference value $\omega_{DM}$. The difference-mode frequency bands of the two BPFs 61 and 62 may be the same or different from each other. Furthermore, the third difference model 60 is provided with a BPF 68 that extracts a predetermined vibration component from the estimated difference angular speed $\omega_{Des}$ estimated by the estimator 14 and a BPF 69 that extracts a predetermined vibration component from the differential value of the estimated difference angular speed $\omega_{Des}$. The frequency bands of the two BPFs 68 and 69 may be the same or different from each other.

In the third difference model 60, a gap is calculated by subtracting the vibration component extracted by the BPF 68 from the vibration component extracted by the BPF 61, and a gap is calculated by subtracting the vibration component extracted by the BPF 69 from the vibration component extracted by the BPF 62. The third difference model 60 is provided with first multipliers 63 and 64 which multiply gains for converting these gaps into torques, second multiplier 65 and 66 which convert the converted torques into the torques for suppressing vibrations, and an adder 67 which adds the two torques for suppressing vibration. This means that the third difference model 60 includes FB control consisting of P control (proportional BPF control) and D control (differential BPF control). The torque outputted from the adder 67 is the above second difference instruction torque $T_{DV}$.

The first controller 13 outputs the first instruction torques (i.e., the first sum instruction torque $T_{Sin}$ and the first difference instruction torque $T_{Din}$) for controlling the left motor 2L and the right motor 2R (in more detail, for suppressing vibrations of the left driving system and the right driving system) via the FF control using the first equivalent sum value and the first equivalent difference value. The first controller 13 of the present embodiment uses the second sum model and the second difference model stored in the storing unit 12 in the FF control. For example, the first controller 13 obtains the first sum instruction torque $T_{Sin}$ by applying the first equivalent sum value $T_{Sds\text{-}ref}$ calculated by the first calculator 11 to the second sum model 30. Similarly, the first controller 13 obtains the first difference instruction torque $T_{Din}$ by applying the first equivalent difference value $T_{Dds\text{-}ref}$ calculated by the first calculator 11 to the above second difference model 40. These first instruction torques $T_{Sin}$ and $T_{Din}$ are transmitted to the third controller 17.

The estimator 14 estimates the above estimated sum angular speed $\omega_{Ses}$ and estimated difference angular speed $\omega_{Des}$ based on the first instruction torques $T_{Sin}$ and $T_{Din}$. Specifically, the estimator 14 substantially estimates the target values (the estimated sum angular speed $\omega_{Ses}$ and the estimated difference angular speed $\omega_{Des}$) of the FB control by using the outputs (the first instruction torques $T_{Sin}$ and $T_{Din}$) of the FF control as the inputs. The estimator 14 of the present embodiment uses the first sum model 26 and the first difference model 27 stored in the storing unit 12 in the estimating. For example, the estimator 14 obtains the estimated sum angular speed $\omega_{Ses}$ by applying, to the above first sum model 26, the first sum instruction torque $T_{Sin}$ (first instruction torque based on the first equivalent sum value) outputted from the first controller 13. Similarly, the estimator 14 obtains the estimated difference angular speed $\omega_{Des}$ by applying, to the above first difference model 27, the first difference instruction torque $T_{Din}$ (first instruction torque based on the first equivalent difference value) outputted from the first controller 13.

In the event of the estimating, the estimator 14 may consider a request of a driver of the vehicle 1 and an accelerating state of the vehicle 1. Examples of the request of the driver include a steering angle and an accelerator operation. Further, examples of the accelerating state include longitudinal acceleration (front-rear G) and the lateral acceleration (lateral G). The estimator 14 may consider either one of or both the request of the driver and the accelerating state. By incorporating the parameters of the request (e.g., steering wheel angle) of the driver and the accelerating state (front-rear G, and lateral G) into the first sum model 26 and the first difference model 27 described above, for example, the estimator 14 can consider the request and the state in the estimating.

The second calculator 15 calculates the above second equivalent sum value $\omega_{SM}$ and second equivalent difference value $\omega_{DM}$. The second calculator 15 of the present embodiment calculates the second equivalent sum value $\omega_{SM}$ and the second second equivalent difference value $\omega_{DM}$ based on a detected value (actual angular speed $\omega_{LM}$) of the left resolver 24L and a detected value (actual angular speed $\omega_{RM}$) of the counterpart right resolver 24R. The following is a calculation equation when the half of the sum of the two actual angular speeds $\omega_{LM}$ and $\omega_{RM}$ is defined as the equivalent sum value (sum-mode motor angular speed $\omega_{SM}$) and the half of the difference between the two actual angular speeds $\omega_{LM}$ and $\omega_{RM}$ is defined as the equivalent difference value (difference-mode motor angular speed $\omega_{DM}$).

$$\begin{pmatrix} \omega_{SM} \\ \omega_{DM} \end{pmatrix} = \begin{pmatrix} \frac{1}{2} & \frac{1}{2} \\ \frac{1}{2} & -\frac{1}{2} \end{pmatrix} \begin{pmatrix} \omega_{RM} \\ \omega_{LM} \end{pmatrix} \qquad \text{[Math 4]}$$

The second controller 16 outputs the second instruction torques (the second sum instruction toque $T_{SV}$ and the second difference instruction torque $T_{DV}$) for controlling the left motor 2L and the right motor 2R (in more detail, for removing the vibration components that the FF control has not removed) via the FB control based on the gap between the estimated sum angular speed $\omega_{Ses}$ and the second equivalent sum value $\omega_{SM}$ or the gap between the estimated difference angular speed $\omega_{Des}$ and the second equivalent difference value $\omega_{DM}$. The second controller 16 may use one of or both the gap of the sum and the gap of the difference.

The second controller 16 of the present embodiment uses the third sum model or the third difference model stored in the storing unit 12 in the FB control. For example, the second controller 16 obtains the above second sum instruction torque $T_{SV}$ by applying the second equivalent sum value $\omega_{SM}$ calculated by the second calculator 15 and the estimated sum angular speed $\omega_{Ses}$ estimated by the estimator 14 to the above third sum model 50. Similarly, the second controller 16 obtains the above second difference instruction torque $T_{DV}$ by applying the second equivalent difference value $\omega_{DM}$ calculated by the second calculator 15 and the estimated difference angular speed $\omega_{Des}$ estimated by the estimator 14 to the above third difference model 60.

Since the above models 50 and 60 include the D control, the second controller 16 uses the differential value of the second equivalent sum value $\omega_{SM}$ or the differential value of the second equivalent difference value $\omega_{DM}$ in the FB control. The second controller 16 may use one of or both the third sum model and the third difference model. The second instruction torques $T_{SV}$ and $T_{DV}$ obtained by the second controller 16 are transmitted to the third controller 17.

The third controller 17 controls the outputs of the left motor 2L and the right motor 2R, using the first instruction torques (the first sum instruction torque $T_{Sin}$ and the first difference instruction torque $T_{Din}$) obtained by the first controller 13 and the second instruction torques (second sum instruction torque $T_{SV}$ and second difference instruction torque $T_{DV}$) obtained by the second controller 16. Specifically, the third controller 17 calculates the left instruction torque $T_{LM}$ and the right instruction torque $T_{RM}$ from the total sum torque obtained by summing the first sum instruction torque $T_{Sin}$ and the second sum instruction torque $T_{SV}$ and the total difference torque obtained by summing the first difference instruction torque $T_{Din}$ and the second difference instruction torque $T_{DV}$ to control the left and right motors 2. Here, in order to deal with the method of calculating in the respective calculators 11 and 15, the half of a value obtained by subtracting the total difference value from the total sum torque is output as the left instruction torque $T_{LM}$, and the half of the sum of the total sum torque and the total difference torque is output as the right instruction torque $T_{RM}$.

Figure 10A:
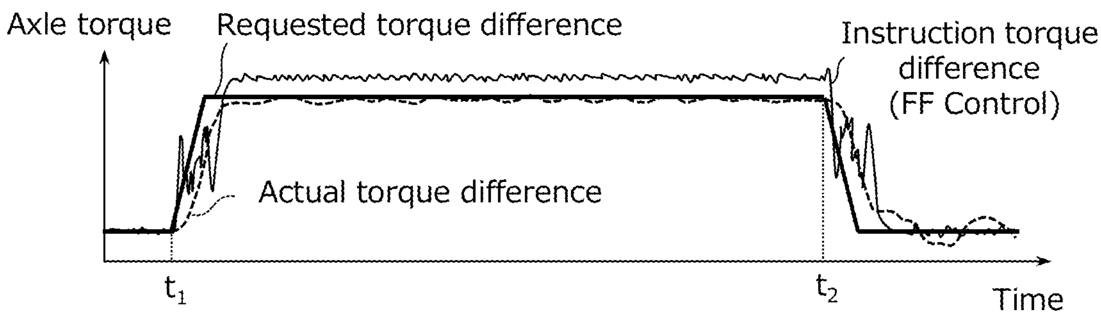
FIGS. 10A and 10B are diagrams showing examples of a result of simulating a vibration component while a vehicle is cornering.
Figure 10B:
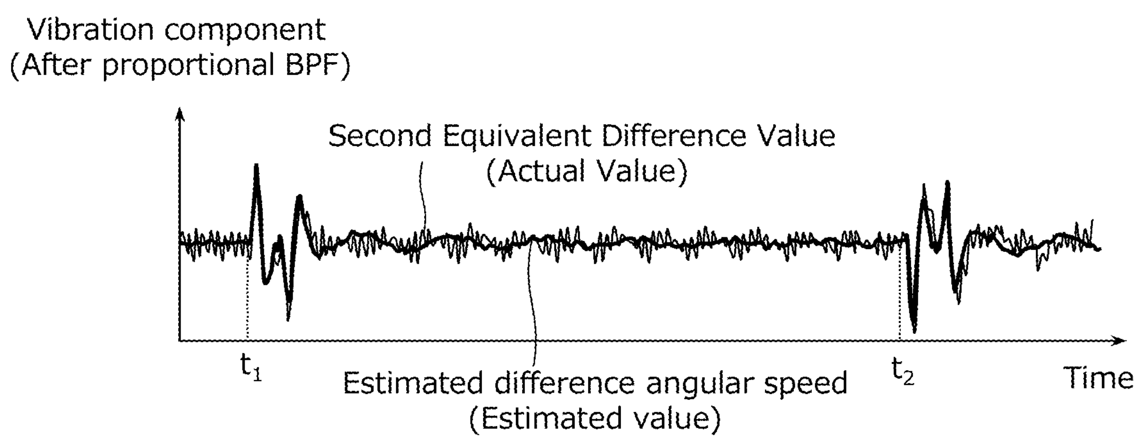

Since the present control considers the outputs of the FF control in the FB control, the FF control and the FB control do not interfere with each other. As an example, results of simulating a vibration component while the vehicle 1 is cornering are shown in FIGS. 10A and 10B. As shown in FIG. 10A, the FF control sometimes vibrates the instruction torque difference (thin solid line) on purpose at a rising time point $t_1$ and a falling time point $t_2$ of the requested torque difference (thick solid line) so that the actual torque difference (dashed line) is controlled to accurately follow the requested torque.

Even in such a case, the FB control of the present control, as described above, obtains the estimated difference angular speed $\omega_{Des}$ from the outputs (that is, the instruction torque difference) of the FF control and extracts the vibration component (thick solid line) from the obtained estimated difference angular speed $\omega_{Des}$. In addition, the FB control also extracts a vibration component (thin solid line) of the second equivalent difference value $\omega_{DM}$ based on the two actual angular speeds $\omega_{LM}$ and $\omega_{RM}$, and the second instruction torque $T_{DV}$ is outputted on the basis of a gap between the two extracted vibration components. As shown in FIG. 10B, in the present control, since the thick solid line and the thin solid line substantially match at the rising time point $t_1$ and the falling time point $t_2$ of the requested torque difference (which means that the gap between the two vibration components comes to be substantially zero), the FB control does not remove the vibration components that the FF control has generated on purpose. On the other hand, the FB control removes components at which the thick solid line and the thin solid line disagree with each other in a range between the rising time point $t_1$ and the falling time point $t_2$.

3. Specific Examples of Models and Others

As described above, the first sum model, the first difference model, the second sum model, and the second difference model may be represented by relational expressions including transfer functions representing the input/output characteristics of a two-inertia system. Hereinafter, description will now be made in relation to transfer functions of the first sum model, the first difference model, the second sum model, and the second difference model that can be set in the vehicle 1 provided with the power distributing mechanism 3. In deriving the first sum model, the first difference model, the second sum model, and the second difference mode, the power distributing mechanism 3 may formulate the models as follows by using vector expression.

$$\text{Matrixes of respective gear ratios } G = \begin{pmatrix} G & 0 \\ 0 & G \end{pmatrix}, \qquad \text{[Math 5]}$$

-continued $$B=\begin{pmatrix} b_2+1 & -b_2 \\ -b_1 & b_1+1 \end{pmatrix}$$

Angular speed vectors $\omega_L=\begin{pmatrix}\omega_{RL}\\ \omega_{LL}\end{pmatrix}$, $\omega_{ds}=\begin{pmatrix}\omega_{Rds}\\ \omega_{Lds}\end{pmatrix}$, $\omega_M=GB\omega_{ds}=\begin{pmatrix}\omega_{RM}\\ \omega_{LM}\end{pmatrix}$ Torque vectors $T_{ds}=\begin{pmatrix}T_{Rds}\\ T_{Lds}\end{pmatrix}$, $T_M=\begin{pmatrix}T_{RM}\\ T_{LM}\end{pmatrix}$, $$T_L=\begin{pmatrix}T_{RL}\\ T_{LL}\end{pmatrix},\ T_{in}=B^TGT_M=\begin{pmatrix}T_{Rin}\\ T_{Lin}\end{pmatrix}$$

Dynamics of left and right wheels 5 (load size), driving side, and axles 4

$$P_L=\begin{pmatrix}\frac{1}{J_{SL}s+D_{SL}} & 0\\ 0 & \frac{1}{J_{DL}s+D_{DL}}\end{pmatrix},\ P_M=\begin{pmatrix}\frac{1}{J_Ms+D_M} & 0\\ 0 & \frac{1}{J_Ms+D_M}\end{pmatrix}$$

$$P_{DS}=\begin{pmatrix}D_s+\frac{K_s}{s} & 0\\ 0 & D_s+\frac{K_s}{s}\end{pmatrix}$$

Establishing the equation of motion (sum and difference) on the driving side for each of the left and right sides using the above equations obtains the following result. In the equations, the symbol $Z_{11}$ represents the reduction ratio from the left driving source (left motor 2L) to the left shaft (left axle 4L), the symbol $Z_{22}$ represents the reduction ratio from the right driving source (right motor 2R) to the right shaft (right axle 4R), and the symbol $Z_c$ represents the reduction ratio from the left and right driving sources to the respective opposing shafts.

[Math 6]

$$\begin{pmatrix}\omega_{Rds}\\ \omega_{Lds}\end{pmatrix}=\frac{G^{-2}P_M}{|Z|}\begin{pmatrix}Z_{22} & -Z_c\\ -Z_c & Z_{11}\end{pmatrix}\begin{pmatrix}T_{Rin}-T_{Rds}\\ T_{Lin}-T_{Lds}\end{pmatrix}$$

$$Z^{-1}=B^{-1^T}B^{-1}=\frac{1}{|Z|}\begin{pmatrix}Z_{22} & -Z_c\\ -Z_c & Z_{11}\end{pmatrix}=$$

$$\frac{1}{(1+b_1+b_2)^2}\begin{pmatrix}b_1^2+2b_1+b_2^2+1 & b_1^2+2b_1+b_2^2+b_2\\ b_1^2+b_1+b_2^2+b_2 & b_2^2+2b_2+b_1^2+1\end{pmatrix}$$

$$Z_{11}=b_2^2+2b_2+b_1^2+1$$

$$Z_{22}=b_1^2+2b_1+b_2^2+1$$

$$Z_c=-(b_1^2+b_1+b_2^2+b_2)$$

Applying a matrix for conversion to the sum and difference modes to both sides of each of the above equations obtains the following equation.

[Math 7]

$$\begin{pmatrix}\frac{1}{2} & \frac{1}{2}\\ \frac{1}{2} & -\frac{1}{2}\end{pmatrix}\begin{pmatrix}\omega_{Rds}\\ \omega_{Lds}\end{pmatrix}=$$

$$\frac{G^{-2}P_M}{|Z|}\begin{pmatrix}\frac{1}{2} & \frac{1}{2}\\ \frac{1}{2} & -\frac{1}{2}\end{pmatrix}\begin{pmatrix}Z_{22} & -Z_c\\ -Z_c & Z_{11}\end{pmatrix}\begin{pmatrix}T_{Rin}-T_{Rds}\\ T_{Lin}-T_{Lds}\end{pmatrix}=$$

$$\frac{G^{-2}P_M}{2|Z|}\begin{pmatrix}Z_{22}-Z_c & Z_{11}-Z_c\\ Z_{22}+Z_c & -(Z_{11}+Z_c)\end{pmatrix}\begin{pmatrix}T_{Rin}-T_{Rds}\\ T_{Lin}-T_{Lds}\end{pmatrix}$$

Here, assuming $b_1=b_2=b$, the equations $Z_{11}-Z_c=Z_{22}-Z_c=|Z|$ and $Z_{11}+Z_c=Z_{22}+Z_c=1$ hold. Therefore, the equations can be modified as follows and the equation of motion of the motors 2 that can deal with the sum and difference modes can be obtained. By dividing the equation of motion of the driving side into the equation of the sum mode and that of the difference mode, the two equations do not interfere with each other.

[Math 8]

$$\begin{pmatrix}\frac{1}{2} & \frac{1}{2}\\ \frac{1}{2} & -\frac{1}{2}\end{pmatrix}\begin{pmatrix}\omega_{Rds}\\ \omega_{Lds}\end{pmatrix}=\frac{G^{-2}P_M}{2|Z|}\begin{pmatrix}|Z| & |Z|\\ 1 & -1\end{pmatrix}\begin{pmatrix}T_{Rin}-T_{Rds}\\ T_{Lin}-T_{Lds}\end{pmatrix}=$$

$$\frac{P_M}{G^2}\begin{pmatrix}1 & 0\\ 0 & \frac{1}{|Z|}\end{pmatrix}\begin{pmatrix}\frac{1}{2} & \frac{1}{2}\\ \frac{1}{2} & -\frac{1}{2}\end{pmatrix}\begin{pmatrix}T_{Rin}-T_{Rds}\\ T_{Lin}-T_{Lds}\end{pmatrix}$$

Equation of motion of driving side $\begin{pmatrix}\omega_{Sds}\\ \omega_{Dds}\end{pmatrix}=\frac{P_M}{G^2}\begin{pmatrix}1 & 0\\ 0 & \frac{1}{|Z|}\end{pmatrix}\begin{pmatrix}T_{Sin}-T_{Sds}\\ T_{Din}-T_{Dds}\end{pmatrix}$ Likewise the derivation of the equation of motion of the driving side, the equations of motion of the left and right wheels 5 (load side) and the axles 4 may be formulated as follows.

[Math 9]

Equation of motion of left and right wheels 5 (load side)

$$\begin{pmatrix}\omega_{RL}\\ \omega_{LL}\end{pmatrix}=P_L\begin{pmatrix}T_{Rds}-T_{RL}\\ T_{Lds}-T_{LL}\end{pmatrix}$$

$$\begin{pmatrix}\frac{1}{2} & \frac{1}{2}\\ \frac{1}{2} & -\frac{1}{2}\end{pmatrix}\begin{pmatrix}\omega_{RL}\\ \omega_{LL}\end{pmatrix}=P_L\begin{pmatrix}\frac{1}{2} & \frac{1}{2}\\ \frac{1}{2} & -\frac{1}{2}\end{pmatrix}\begin{pmatrix}T_{Rds}-T_{RL}\\ T_{Lds}-T_{LL}\end{pmatrix}$$

$$\begin{pmatrix}\omega_{SL}\\ \omega_{DL}\end{pmatrix}=P_L\begin{pmatrix}T_{Sds}-T_{SL}\\ T_{Dds}-T_{DL}\end{pmatrix}$$

Equation of motion of axles 4

$$\begin{pmatrix}T_{Rds}\\ T_{Lds}\end{pmatrix}=P_{DS}\begin{pmatrix}\omega_{Rds}-\omega_{RL}\\ \omega_{Lds}-\omega_{LL}\end{pmatrix}$$

$$\begin{pmatrix}\frac{1}{2} & \frac{1}{2}\\ \frac{1}{2} & -\frac{1}{2}\end{pmatrix}\begin{pmatrix}T_{Rds}\\ T_{Lds}\end{pmatrix}=P_{DS}\begin{pmatrix}\frac{1}{2} & \frac{1}{2}\\ \frac{1}{2} & -\frac{1}{2}\end{pmatrix}\begin{pmatrix}\omega_{Rds}-\omega_{RL}\\ \omega_{Lds}-\omega_{LL}\end{pmatrix}$$

$$\begin{pmatrix}T_{Sds}\\ T_{Dds}\end{pmatrix}=P_{DS}\begin{pmatrix}\omega_{Sds}-\omega_{SL}\\ \omega_{Dds}-\omega_{DL}\end{pmatrix}$$

Here, since the dynamics of the left and right wheels 5 (load side) is represented by PL of the above Math 5, the equation of motion of the left and right wheels 5 (load side) of the above Math 8 is rewritten as follows.

[Math 10]

$$\begin{pmatrix}\omega_{SL}\\ \omega_{DL}\end{pmatrix}=$$

$$P_L\begin{pmatrix}T_{Sds}-T_{SL}\\ T_{Dds}-T_{DL}\end{pmatrix}=\begin{pmatrix}\frac{1}{J_{SL}s+D_{SL}} & 0\\ 0 & \frac{1}{J_{DL}s+D_{DL}}\end{pmatrix}\begin{pmatrix}T_{Sds}-T_{SL}\\ T_{Dds}-T_{DL}\end{pmatrix}$$

Since the FF control does not consider disturbances, the sum-mode wheel load-side torque $T_{SL}=0$ and the difference-mode wheel load-side torque $T_{DL}=0$ are obtained, and the following Math 11 holds.

[Math 11]

$$\begin{pmatrix}\omega_{SL}\\ \omega_{DL}\end{pmatrix} = \begin{pmatrix}\frac{1}{J_{SL}s+D_{SL}} & 0\\ 0 & \frac{1}{J_{DL}s+D_{DL}}\end{pmatrix}\begin{pmatrix}T_{Sds}\\ T_{Dds}\end{pmatrix}$$

Here, since the dynamics of the driving side is represented by $P_M$ of the above Math 5, the equation of motion of the driving side of the above Math 8 is rewritten as follows.

[Math 12]

$$\begin{pmatrix}\omega_{Sds}\\ \omega_{Dds}\end{pmatrix} = \frac{P_M}{G^2}\begin{pmatrix}1 & 0\\ 0 & \frac{1}{(2b+1)^2}\end{pmatrix}\begin{pmatrix}T_{Sin}-T_{Sds}\\ T_{Din}-T_{Dds}\end{pmatrix} = \frac{1}{G^2}\left(\frac{1}{J_M s+D_M}\right)\begin{pmatrix}1 & 0\\ 0 & \frac{1}{(2b+1)^2}\end{pmatrix}\begin{pmatrix}T_{Sin}-T_{Sds}\\ T_{Din}-T_{Dds}\end{pmatrix}$$

Furthermore, since the dynamics of the axles 4 is represented by $P_{DS}$ of the above Math 5, the equation of motion of the axles 4 of the above Math 8 is rewritten as follows.

[Math 13]

$$\begin{pmatrix}T_{Sds}\\ T_{Dds}\end{pmatrix} = P_{DS}\begin{pmatrix}\omega_{Sds}-\omega_{SL}\\ \omega_{Dds}-\omega_{DL}\end{pmatrix} = \begin{pmatrix}D_s+\frac{K_s}{s} & 0\\ 0 & D_s+\frac{K_s}{s}\end{pmatrix}\begin{pmatrix}\omega_{Sds}-\omega_{SL}\\ \omega_{Dds}-\omega_{DL}\end{pmatrix}$$

The following Math 14 is obtained by solving the above Math 11, Math 12, and Math 13 for $\omega_{Sds}$ and $T_{Sin}$ and for $\omega_{Dds}$ and $T_{Din}$. Math 11-13 are rearranged using the relationships $J_{SM}=G^2J_M$, $D_{SM}=G^2D_M$, $J_{DM}=(2b_1+1)^2G^2J_M$, $D_{DM}=(2b_1+1)^2G^2D_M$. This is a transfer function from the input torques (the first sum instruction torque $T_{Sin}$ and the first difference instruction torque $T_{Din}$) to the motor angular speeds (the estimated sum angular speed $\omega_{Ses}$ and the estimated difference angular speed $\omega_{Des}$), and Math 14 may be set to the first sum model and the first difference model.

[Math 14]

$$\begin{pmatrix}\omega_{Sds}/T_{Sin}\\ \omega_{Dds}/T_{Din}\end{pmatrix} = \begin{pmatrix}\dfrac{J_{SL}s^2+(D_{SL}+D_S)s+K_S}{J_{SM}J_{SL}s^3+\{J_{SM}(D_{SL}+D_S)+J_{SL}(D_{SM}+D_S)\}s^2+\{D_{SM}D_{SL}+D_{SM}D_S+D_{SL}D_S+K_S(J_{SM}+J_{SL})\}s+K_S(D_{SM}+D_{SL})}\\ \dfrac{J_{DL}s^2+(D_{DL}+D_S)s+K_S}{J_{DM}J_{DL}s^3+\{J_{DM}(D_{DL}+D_S)+J_{DL}(D_{DM}+D_S)\}s^2+\{D_{DM}D_{DL}+D_{DM}D_S+D_{DL}D_S+K_S(J_{DM}+J_{DL})\}s+K_S(D_{DM}+D_{DL})}\end{pmatrix}$$

Further, by substituting Math 11 and Math 12 for $\omega_{Sds}$, $\omega_{Dds}$, $\omega_{SL}$, $\omega_{DL}$ in the above Math 13, and rearranging Math 13 using the relationships $J_{SM}=G^2J_M$, $D_{SM}=G_2D_M$, $J_{DM}=(2b_1+1)^2G^2J_M$, $D_{DM}=(2b_1+1)^2G_2D_M$, the following equation is obtained. Thereby, the sum-mode axle torque $T_{Sds}$ and the difference-mode axle torque $T_{Dds}$ when the first sum instruction torque $T_{Sin}$ and the first difference instruction torque $T_{Din}$ are applied to the axles 4 are obtained.

[Math 15]

$$\begin{pmatrix}T_{Sds}/T_{Sin}\\ T_{Dds}/T_{Din}\end{pmatrix} = \begin{pmatrix}\dfrac{J_{SL}D_Ss^2+(D_{SL}D_S+J_{SL}K_S)s+D_{SL}K_S}{J_{SM}J_{SL}s^3+\{J_{SM}(D_{SL}+D_S)+J_{SL}(D_{SM}+D_S)\}s^2+\{D_{SM}D_{SL}+D_{SM}D_S+D_{SL}D_S+K_S(J_{SM}+J_{SL})\}s+K_S(D_{SM}+D_{SL})}\\ \dfrac{J_{DL}D_Ss^2+(D_{DL}D_S+J_{DL}K_S)s+D_{DL}K_S}{J_{DM}J_{DL}s^3+\{J_{DM}(D_{DL}+D_S)+J_{DL}(D_{DM}+D_S)\}s^2+\{D_{DM}D_{DL}+D_{DM}D_S+D_{DL}D_S+K_S(J_{DM}+J_{DL})\}s+K_S(D_{DM}+D_{DL})}\end{pmatrix}$$

The following equation is obtained by inverting the transfer function of the above Math 15, setting the requested torques calculated in, for example, the superordinate ECU to $T_{Sds\text{-}ref}$ and $T_{Dds\text{-}ref}$, and substituting the requested torques $T_{Sds\text{-}ref}$ and $T_{Dds\text{-}ref}$ for the axle torques $T_{Sds}$ and $T_{Dds}$ of Math 15.

[Math 16]

$$\begin{pmatrix}T_{Sin}/T_{Sds-ref}\\ T_{Din}/T_{Dds-ref}\end{pmatrix} = \begin{pmatrix}\dfrac{J_{SM}J_{SL}s^3+\{J_{SM}(D_{SL}+D_S)+J_{SL}(D_{SM}+D_S)\}s^2+\{D_{SM}D_{SL}+D_{SM}D_S+D_{SL}D_S+K_S(J_{SM}+J_{SL})\}s+K_S(D_{SM}+D_{SL})}{J_{SL}D_Ss^2+(D_{SL}D_S+J_{SL}K_S)s+D_{SL}K_S}\\ \dfrac{J_{DM}J_{DL}s^3+\{J_{DM}(D_{DL}+D_S)+J_{DL}(D_{DM}+D_S)\}s^2+\{D_{DM}D_{DL}+D_{DM}D_S+D_{DL}D_S+K_S(J_{DM}+J_{DL})\}s+K_S(D_{DM}+D_{DL})}{J_{DL}D_Ss^2+(D_{DL}D_S+J_{DL}K_S)s+D_{DL}K_S}\end{pmatrix}$$

Since the transfer function in the above Math 16 is not proper, the transfer function is formed into a proper form by means of a second-order low-pass filter and the following equation is obtained. This can calculate torques (i.e., the first sum instruction torque $T_{Sin}$ and the first difference instruction torque $T_{Din}$) to be provided to the motors 2 in the FF control to obtain the requested sum- and difference-mode axle torques $T_{Sds\text{-}ref}$ and $T_{Dds\text{-}ref}$. That is, the following Math 17 is an example of a transfer function included in the sum model and the difference model.

[Math 7]

$$\begin{pmatrix}T_{Sin}/T_{Sds-ref}\\ T_{Din}/T_{Dds-ref}\end{pmatrix} = \begin{pmatrix}\dfrac{J_{SM}J_{SL}s^3+\{J_{SM}(D_{SL}+D_S)+J_{SL}(D_{SM}+D_S)\}s^2+\{D_{SM}D_{SL}+D_{SM}D_S+D_{SL}D_S+K_S(J_{SM}+J_{SL})\}s+K_S(D_{SM}+D_{SL})}{J_{SL}D_Ss^2+(D_{SL}D_S+J_{SL}K_S)s+D_{SL}K_S}\\ \dfrac{J_{DM}J_{DL}s^3+\{J_{DM}(D_{DL}+D_S)+J_{DL}(D_{DM}+D_S)\}s^2+\{D_{DM}D_{DL}+D_{DM}D_S+D_{DL}D_S+K_S(J_{DM}+J_{DL})\}s+K_S(D_{DM}+D_{DL})}{J_{DL}D_Ss^2+(D_{DL}D_S+J_{DL}K_S)s+D_{DL}K_S}\end{pmatrix}\frac{1}{(\tau s+1)^2}$$

4. Effect (1) In the above control device 10, the first calculator 11 calculates the first equivalent sum value corresponding to the sum of the left requested torque and the right requested torque and the first equivalent difference value corresponding to the difference between the left requested torque and the right requested torque. Then, the first controller 13 outputs the first instruction torques $T_{Sin}$ and $T_{Din}$ for controlling the left motor 2L and the right motor 2R via the FF control using the first equivalent sum value and the first equivalent difference value. Further, the estimator 14 estimates the estimated sum speed (estimated sum angular speed $\omega_{Ses}$) and the estimated difference speed (estimated difference angular speed $\omega_{Des}$) based on the first instruction torques $T_{Sin}$ and $T_{Din}$, and the second calculator 15 calculates the second equivalent sum value $\omega_{SM}$ corresponding to the sum of the left actual speed and the right actual speed (two actual angular speeds $\omega_{LM}$ and $\omega_{RM}$) and the second equivalent difference value $\omega_{DM}$ corresponding to the difference between the left actual speed and the right actual speed (two actual angular speeds $\omega_{LM}$ and $\omega_{RM}$). Furthermore, the second controller 16 outputs the second instruction torques (the second sum instruction toque $T_{SV}$ and the second difference instruction torque $T_{DV}$) for controlling the left motor 2L and the right motor 2R via the FB control based on the gap between the estimated sum angular speed $\omega_{Ses}$ and the second equivalent sum value $\omega_{SM}$ and the gap between the estimated difference angular speed $\omega_{Des}$ and the second equivalent difference value $\omega_{DM}$. The third controller 17 controls the outputs of the left and right motors 2, using the first instruction torques $T_{Sin}$ and $T_{Din}$ and the second instruction torques $T_{SV}$ and $T_{DV}$.

As described above, since calculation of the instruction torques for controlling the left motor 2L and right motor 2R is separated for a vibration while the vehicle 1 is running straight (sum mode) and a vibration while the vehicle 1 is cornering (difference mode) from each other and the respective torques for the two modes are separately obtained, vibrations of the left and right axles 4 having a vibration characteristic different between a running-straight state and a cornering state can be suppressed without interfering with each other. In addition, by separating the sum mode corresponding to the running-straight state and the difference mode corresponding to the cornering state and obtaining respective torques of these modes, the requirement for a complex decoupling (not interfering) can be eliminated, so that the control device 10 can be designed more simply and the vibration suppression can be achieved with a simple configuration. In addition, by using the outputs (first instruction torques) of the FF control in the FB control, the FB control does not remove components that the FF control intentionally vibrated. That is, it is possible to prevent control interference between the FF control and the FB control.

(2) The above embodiment prepares the first sum model that models the motion states of the left and right driving systems in the running-straight state and the first difference model that models the motion states of the left and right driving systems in the cornering state, and the estimator 14 uses the first sum model and the first difference model in the estimating. This configuration can separately estimate the motion states of the running-straight state and the corning state, which states have different motion states, from each other with a simple configuration. This can increase estimation accuracy and can achieve higher controllability.

(3) Further, since first sum model and first difference model are each constructed in a two-inertia system model, estimation considering viscoelasticity can be performed with a simple configuration, so that the estimation accuracy can be further enhanced.

(4) As shown in FIG. 6A, the above first sum model can be expressed by in the transfer function indicating the input/output characteristic of the two-inertia system including the driving-side inertia calculated based on the inertia of the left motor 2L and the right motor 2R, the spring damper designed with the stiffness and the viscosity, and the load-side inertia calculated based on the body weight of the vehicle 1. As a result, the speed while the vehicle 1 is running straight can be accurately estimated, considering the viscoelasticity, so that the controllability of the vehicle 1 can be enhanced.

(5) As shown in FIG. 6B, the above first difference model can be expressed by the transfer function indicating the input/output characteristic of the two-inertia system including the driving-side inertia corresponding to the equivalent inertia when a left-right difference is generated which equivalent inertia is calculated based on the torque difference amplification ratio, the spring damper designed with the stiffness and the viscosity, and the load-side inertia calculated based on the yaw inertia of the vehicle 1. As a result, the speed while the vehicle 1 is cornering can be accurately estimated, considering the viscoelasticity, so that the controllability of the vehicle 1 can be enhanced.

(6) In addition, if the estimator 14 is configured to consider a request (e.g., steering wheel angle or accelerator opening) of a driver of the vehicle 1 and an accelerating state of the vehicle 1 (front-rear G or lateral G) in the estimating, the estimating can reflect actual driving state, so that the estimation accuracy can be enhanced and the controllability (e.g., the control accuracy and/or the control response speed) of the vibration suppressing control can be enhanced.

(7) The above embodiment prepares the second sum model and the second difference model each constructed in a two-inertia system model, and the first controller 13 uses the second sum model and the second difference model in the FF control. With such a configuration, it is possible to construct models for the FF control which models are independent of each other with a simple configuration. In addition, on a vibration characteristic that is different between the running-straight state and the cornering state, control considering the respective viscoelasticity can be carried out. Accordingly, the controllability of the vehicle 1 can be enhanced, and a higher vibration-suppressing effect can be obtained.

(8) As shown in FIG. 6A, the above second sum model can be expressed by the transfer function indicating the input/output characteristic of the two-inertia system including the driving-side inertia calculated based on the inertia of the left motor 2L and the right motor 2R, the spring damper designed with the stiffness and viscosity, and the load-side inertia calculated based on the body weight of the vehicle 1. As a result, the vibration while the vehicle 1 is running straight can be efficiently suppressed, considering the viscoelasticity, so that the controllability of the vehicle 1 can be enhanced.

(9) As shown in FIG. 6B, the above second difference model can be expressed by the transfer function indicating the input/output characteristic of the two-inertia system including the driving-side inertia corresponding to the equivalent inertia when a left-right difference is generated which equivalent inertia is calculated based on the torque difference amplification ratio, the spring damper designed with the stiffness and viscosity, and the load-side inertia calculated based on the yaw inertia of the vehicle 1. As a result, the vibration while the vehicle 1 is cornering can be efficiently suppressed, considering the viscoelasticity, so that the controllability of the vehicle 1 can be enhanced.

(10) The above embodiment prepares the third sum model and the third difference model including the respective BPFs for extracting the vibration components, and the second controller 16 uses the third sum model and the third difference model in the FB control. With such a configuration, it is possible to construct models for the FB control which models are independent of each other with a simple configuration. The BPSs make it possible to extract vibrations of the respective particular frequency bands from vibrations generated while the vehicle 1 is running straight and cornering and obtain the second instruction torques $T_{SV}$ and $T_{DV}$ that can suppress the extracted vibrations. Therefore, the vibration suppressing effect can be enhanced.

(11) In the above embodiment, the FB control further uses the differential value of the second equivalent sum value $\omega_{SM}$ or the differential value of the second equivalent difference value $\omega_{DM}$. As described above, the second controller 16 performs the FB control including the P control and the D control, so that the speed of converging the gap is increased and the vibration suppressing effect can be further enhanced.

(12) In addition, the third sum model may include the BPF that extracts the sum-mode frequency band of the first predetermined range covering the resonant frequency $RF_S$ (e.g., 6 Hz) of the left driving system and the right driving system while the vehicle 1 is running straight and the difference model may include the BPF that extracts the difference-mode frequency band of the second predetermined range covering the resonant frequency $RF_C$ (e.g., 2 Hz) of the left driving system and the right driving system while the vehicle 1 is cornering. In this case, by setting the sum-mode frequency band and the difference-mode frequency band not to overlap each other, only the vibration of the minimal-requisite frequency band can be extracted, as shown in FIG. 9. Therefore, in addition to the vibration suppressing effect, responsiveness (in particular, the acceleration responsiveness) can be enhanced.

5. Miscellaneous

The above embodiment is merely illustrative, and is not intended to exclude the application of various modifications and techniques not explicitly described in the present embodiment. Each configuration of the present embodiment can be variously modified and implemented without departing from the scope thereof. In addition, the configurations of the present embodiment can be selected and omitted as needed, or can be combined appropriately.

For example, the above control device 10 includes two calculators 11 and 15 and three controllers 13, 16, and 17, but these classifications are for convenience. Alternatively, one calculator may have the functions of the two calculators 11 and 15 and one controller may have the functions of the three controllers 13, 16, and 17. Further, in the above embodiment, a case is illustrated which estimates the speeds using the first sum model and the first difference model stored in the storing unit 12. Alternatively, any scheme even not using models can be applied as far as the scheme estimates the speeds by separating the sum mode and the difference mode from each other. In addition, a case is illustrated which carries out the FF control using the second sum model and the second difference model. Alternatively, any scheme even not using models can be applied as far as the scheme carries out the FF control by separating the sum mode and the difference mode from each other. Similarly, the FB control using the third sum model and the third difference model stored in the storing unit 12 can be replaced with another scheme of FB control as far as the FB control separates the sum mode and the difference mode from each other.

Furthermore, the above models 26, 27, 30, 40, 50, and 60 are merely examples and are not limited to the configurations shown in the above FIGS. 7 and 8. For example, a configuration that extracts vibration components from the estimated sum angular speed $\omega_{Ses}$ and the estimated difference angular speed $\omega_{Des}$ estimated by the estimator 14 do not have to be included in the third sum model and the third difference model. Further alternatively, if only one of the third sum model and the third difference model is used, the only one of the models may be stored in the storing unit 12 and the other may be omitted.

The above embodiment uses the left-axle requested torque $T_{Lds\text{-}ref}$ and the right-axle requested torque $T_{Rds\text{-}ref}$ as the left requested torque and the right axle requested torque, respectively, but may alternatively use a requested torque to the left motor 2L and a requested torque to the right motor 2R as the left requested torque and the right requested torque, respectively.

The above embodiment describes the vehicle 1 that mounts thereon the pair of motors 2 serving as driving sources, but an internal combustion engine may be applied in place of the motors 2. The specific type of the driving source is not limited. The vehicle 1 that includes a vehicle driving device (DM-AYC device) including the pair of motors 2 and the power distributing mechanism 3 is illustrated. However, the concept of the sum mode and the difference mode can be applied to any vehicle exemplified by a vehicle without the power distributing mechanism 3 or an in-wheel motor vehicle. A vehicle provided with at least a left driving system including a left axle and a left wheel to which motion power from the left driving source is transmitted and a right driving system including a right axle and a right wheel to which motion power from the right driving source is transmitted can undergo the control the same as the above embodiment and can obtain the same actions and effects as those of the above embodiment.

6. Appendix

In relation to the above embodiment and the modifications, the following appendices will now be disclosed.

Appendix 1

A vehicle control device for a vehicle, the vehicle comprising: a left driving system including a left axle and a left wheel, motion power from a left driving source being transmitted to the left axle and the left wheel; a right driving system including a right axle and a right wheel, motion power from a right driving source being transmitted to the right axle and the right wheel; and detectors that each detect one of an actual speed of the left driving system or the left driving source and an actual speed of the right driving system or the right driving source, the vehicle control device comprising:

- a first calculator that calculates a first equivalent sum value corresponding to a sum of a left requested torque being a requested torque to the left driving system or the left driving source and a right requested torque being a requested torque to the right driving system or the right driving source and calculates a first equivalent difference value corresponding to a difference between the left requested torque and the right requested torque;

a first controller that outputs a first instruction torque to control the left driving source and the right driving source by performing a feed-forward control using the first equivalent sum value and the first equivalent difference value;

an estimator that estimates, based on the first instruction torque, an estimated sum speed corresponding to a sum of an estimated speed of the left driving source and an estimated speed of the right driving source and an estimated difference speed corresponding to a difference between the two estimated speeds;

a second calculator that calculates a second equivalent sum value corresponding to a sum of the two actual speeds and a second equivalent difference value corresponding to a difference between the two actual speeds;

a second controller that outputs a second instruction torque to control the left driving source and the right driving source by performing a feed-back control based on a gap between the second equivalent sum value and the estimated sum speed or a gap between the second equivalent difference value and the estimated difference speed; and a third controller that controls outputs of the left driving source and the right driving source, using the first instruction torque and the second instruction torque.

Appendix 2

The vehicle control device according to appendix 1, further comprising:

a first sum model that models motion states of the left driving system and the right driving system while the vehicle is running straight, the first instruction torque being applied to the first sum model; and a first difference model that models motion states of the left driving system and the right driving system while the vehicle is cornering, the first instruction torque being applied to the first difference model, wherein the estimator uses the first sum model and the first difference model in the estimating.

Appendix 3

The vehicle control device according to appendix 2, wherein the first sum model and the first difference model are both two-inertia system models.

Appendix 4

The vehicle control device according to appendix 2 or 3, wherein the first sum model includes a transfer function indicating an input/output characteristic of a two-inertia system including driving-side inertia calculated based on inertia of the left driving source and inertia of the right driving source, a spring damper designed with a stiffness and a viscosity, and load-side inertia calculated based on a vehicle body weight of the vehicle.

Appendix 5

The vehicle control device according to any one of appendices 2-4, wherein the first difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

Appendix 6

The vehicle control device according to any one of appendices 1-5, wherein the estimator considers a request of a driver of the vehicle and an accelerating state of the vehicle in the estimating.

Appendix 7

The vehicle control device according to any one of appendices 1-6, further comprising:

a second sum model that models motion states of the left driving system and the right driving system while the vehicle is running straight, the first equivalent sum value being applied to the second sum model; and a second difference model that models motion states of the left driving system and the right driving system while the vehicle is cornering, the first equivalent difference value being applied to the second difference model, wherein the first controller uses the second sum model and the second difference model in the feed-forward control.

Appendix 8

The vehicle control device according to appendix 7, wherein the second sum model and the second difference model are both two-inertia system models.

Appendix 9

The vehicle control device according to appendix 7 or 8, wherein the second sum model includes a transfer function indicating an input/output characteristic of a two-inertia system including driving-side inertia calculated based on inertia of the left driving source and inertia of the right driving source, a spring damper designed with a stiffness and a viscosity, and load-side inertia calculated based on a vehicle body weight of the vehicle.

Appendix 10

The vehicle control device according to any one of appendices 7-9, wherein the second difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

Appendix 11

The vehicle control device according to any one of appendices 1-10, further comprising a third sum model that models motion states of the left driving system and the right driving system while the vehicle is running straight, the second equivalent sum value being applied to the third sum model; and a third difference model that models motion states of the left driving system and the right driving system while the vehicle is cornering, the second equivalent difference value being applied to the third difference model, wherein each of the third sum model and the third difference mode includes a band-pass filter that extracts a vibration component, and the second controller uses the third sum model or the third difference model in the feed-back control.

Appendix 12

The vehicle control device according to appendix 11, wherein the second controller further uses a differential value of the second equivalent sum value or a differential value of the second equivalent difference value in the feed-back control.

Appendix 13

The vehicle control device according to appendix 11 or 12, wherein the third sum model includes the band-pass filter that extracts a sum-mode frequency band in a first predetermined range covering a resonant frequency of the left driving system and the right driving system while the vehicle is running straight, and the third difference model includes the band-pass filter that extracts a difference-mode frequency band in a second predetermined range covering a resonant frequency of the left driving system and the right driving system while the vehicle is cornering, the difference-mode frequency band not overlapping the sum-mode frequency band.

Appendix 14

A vehicle control method for a vehicle, the vehicle comprising: a left driving system including a left axle and a left wheel, motion power from a left driving source being transmitted to the left axle and the left wheel; a right driving system including a right axle and a right wheel, motion power from a right driving source being transmitted to the right axle and the right wheel; and detectors that each detect one of an actual speed of the left driving system or the left driving source and an actual speed of the right driving system or the right driving source, the vehicle control method comprising:

calculating a first equivalent sum value corresponding to a sum of a left requested torque being a requested torque to the left driving system or the left driving source and a right requested torque being a requested torque to the right driving system or the right driving source and calculating a first equivalent difference value corresponding to a difference between the left requested torque and the right requested torque;

outputting a first instruction torque to control the left driving source and the right driving source by performing a feed-forward control using the first equivalent sum value and the first equivalent difference value;

estimating, based on the first instruction torque, an estimated sum speed corresponding to a sum of an estimated speed of the left driving source and an estimated speed of the right driving source and an estimated difference speed corresponding to a difference between the two estimated speeds;

calculating a second equivalent sum value corresponding to a sum of the two actual speeds and a second equivalent difference value corresponding to a difference between the two actual speeds;

outputting a second instruction torque to control the left driving source and the right driving source by performing a feed-back control based on a gap between the second equivalent sum value and the estimated sum speed and a gap between the second equivalent difference value and the estimated difference speed; and controlling outputs of the left driving source and the right driving source, using the first instruction torque and the second instruction torque.

Appendix 15

The vehicle control method according to appendix 14, further comprising:

preparing, in advance, a first sum model that models motion states of the left driving system and the right driving system while the vehicle is running straight, and a first difference model that models motion states of the left driving system and the right driving system while the vehicle is cornering, the first instruction torque being applied to the first sum model and the first difference model; and using the first sum model and the first difference model in the estimating.

Appendix 16

The vehicle control method according to appendix 15, wherein the first sum model and the first difference model are both two-inertia system models.

Appendix 17

The vehicle control method according to any one of appendices 14-16, further comprising considering a request of a driver of the vehicle and an accelerating state of the vehicle in the estimating.

Appendix 18

The vehicle control method according to any one of appendices 14-17, further comprising:

preparing, in advance, a second sum model that models motion states of the left driving system and the right driving system while the vehicle is running straight, the first equivalent sum value being applied to the second sum model, and a second difference model that models motion states of the left driving system and the right driving system while the vehicle is cornering, the first equivalent difference value being applied to the second difference model; and using the second sum model and the second difference model in the feed-forward control.

Appendix 19

The vehicle control method according to appendix 18, wherein the second sum model and the second difference model are both two-inertia system models.

Appendix 20

The vehicle control method according to any one of appendices 14-19, further comprising preparing, in advance, a third sum model that models motion states of the left driving system and the right driving system while the vehicle is running straight, the second equivalent sum value being applied to the third sum model, and a third difference model that models motion states of the left driving system and the right driving system while the vehicle is cornering, the second equivalent difference value being applied to the third difference model, wherein each of the third sum model and the third difference mode includes a band-pass filter that extracts a vibration component, and the vehicle control method further comprises using the third sum model or the third difference model in the feed-back control.

INDUSTRIAL APPLICABILITY

The present embodiment is applicable to manufacturing industries of a vehicle control device and also applicable to manufacturing industries of a vehicle provided with the vehicle control device.

DESCRIPTION OF REFERENCE SIGN

1 Vehicle
2 Motor (Driving Source)
3 Power Distributing Mechanism
4 Axle
5 Left and Right Wheels
6 Inverter
7 Battery
10 Control Device
11 First Calculator
12 Storing Unit
13 First Controller
14 Estimator
15 Second Calculator
16 Second Controller
17 Third Controller
21 Accelerator Position Sensor
22 Brake Sensor
23 Steering Angle Sensor
24, 24L, 24R Resolver (Detector)
25, 25L, 25R Wheel Speed Sensor
26 First Sum Model
27 First Difference Model
30 Second Sum Model
40 Second Difference Model
50 Third Sum Model
51, 52, 58, 59 Band-Pass Filter, BPF
53, 54 First Multiplier
55, 56 Second Multiplier
57 Adder
60 Third Difference Model
61, 62, 68, 69 Band-Pass Filter, BPF
63, 64 First Multiplier
65, 66 Second Multiplier
67 Adder

The invention claimed is:

1. A vehicle control device for a vehicle, the vehicle comprising: a left driving system including a left axle and a left wheel, motion power from a left driving source being transmitted to the left axle and the left wheel; a right driving system including a right axle and a right wheel, motion power from a right driving source being transmitted to the right axle and the right wheel; and detectors that each detect one of an actual speed of the left driving system or the left driving source and an actual speed of the right driving system or the right driving source, the vehicle control device comprising:

a first calculator that calculates a first equivalent sum value corresponding to a sum of a left requested torque being a requested torque to the left driving system or the left driving source and a right requested torque being a requested torque to the right driving system or the right driving source and calculates a first equivalent difference value corresponding to a difference between the left requested torque and the right requested torque;

a first controller that outputs a first instruction torque to control the left driving source and the right driving source by performing a feed-forward control using the first equivalent sum value and the first equivalent difference value;

an estimator that estimates, based on the first instruction torque, an estimated sum speed corresponding to a sum of an estimated speed of the left driving source and an estimated speed of the right driving source and an estimated difference speed corresponding to a difference between the two estimated speeds;

a second calculator that calculates a second equivalent sum value corresponding to a sum of the two actual speeds and a second equivalent difference value corresponding to a difference between the two actual speeds;

a second controller that outputs a second instruction torque to control the left driving source and the right driving source by performing a feed-back control based on a gap between the second equivalent sum value and the estimated sum speed or a gap between the second equivalent difference value and the estimated difference speed; and a third controller that controls outputs of the left driving source and the right driving source, using the first instruction torque and the second instruction torque.

2. The vehicle control device according to claim 1, further comprising a first sum model that models motion states of the left driving system and the right driving system while the vehicle is running straight, the first instruction torque being applied to the first sum model; and a first difference model that models motion states of the left driving system and the right driving system while the vehicle is cornering, the first instruction torque being applied to the first difference model, wherein the estimator uses the first sum model and the first difference model in the estimating.

3. The vehicle control device according to claim 2, wherein the first sum model and the first difference model are both two-inertia system models.

4. The vehicle control device according to claim 3, wherein the first sum model includes a transfer function indicating an input/output characteristic of a two-inertia system including driving-side inertia calculated based on inertia of the left driving source and inertia of the right driving source, a spring damper designed with a stiffness and a viscosity, and load-side inertia calculated based on a vehicle body weight of the vehicle.

5. The vehicle control device according to claim 4, wherein the first difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

6. The vehicle control device according to claim 3, wherein the first difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

7. The vehicle control device according to claim 1, wherein the estimator considers a request of a driver of the vehicle and an accelerating state of the vehicle in the estimating.

8. The vehicle control device according to claim 1, further comprising:

a second sum model that models motion states of the left driving system and the right driving system while the vehicle is running straight, the first equivalent sum value being applied to the second sum model; and a second difference model that models motion states of the left driving system and the right driving system while the vehicle is cornering, the first equivalent difference value being applied to the second difference model, wherein the first controller uses the second sum model and the second difference model in the feed-forward control.

9. The vehicle control device according to claim 8, wherein the second sum model and the second difference model are both two-inertia system models.

10. The vehicle control device according to claim 9, wherein the second sum model includes a transfer function indicating an input/output characteristic of a two-inertia system including driving-side inertia calculated based on inertia of the left driving source and inertia of the right driving source, a spring damper designed with a stiffness and a viscosity, and load-side inertia calculated based on a vehicle body weight of the vehicle.

11. The vehicle control device according to claim 10, wherein the second difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

12. The vehicle control device according to claim 9, wherein the second difference model includes a transfer function indicating an input/output characteristic of a two-inertia system including driving-side inertia being equivalent inertia when a left-right difference is generated, a spring damper designed with a stiffness and a viscosity, and load-side inertia calculated based on a yaw inertia of the vehicle, the equivalent inertia being calculated based on a torque difference amplification ratio.

13. The vehicle control device according to claim 1, further comprising a third sum model that models motion states of the left driving system and the right driving system while the vehicle is running straight, the second equivalent sum value being applied to the third sum model; and a third difference model that models motion states of the left driving system and the right driving system while the vehicle is cornering, the second equivalent difference value being applied to the third difference model, wherein each of the third sum model and the third difference mode includes a band-pass filter that extracts a vibration component, and the second controller uses the third sum model or the third difference model in the feed-back control.

14. The vehicle control device according to claim 13, wherein the second controller further uses a differential value of the second equivalent sum value or a differential value of the second equivalent difference value in the feed-back control.

15. The vehicle control device according to claim 14, wherein the third sum model includes the band-pass filter that extracts a sum-mode frequency band in a first predetermined range covering a resonant frequency of the left driving system and the right driving system while the vehicle is running straight, and the third difference model includes the band-pass filter that extracts a difference-mode frequency band in a second predetermined range covering a resonant frequency of the left driving system and the right driving system while the vehicle is cornering, the difference-mode frequency band not overlapping the sum-mode frequency band.

16. The vehicle control device according to claim 13, wherein the third sum model includes the band-pass filter that extracts a sum-mode frequency band in a first predetermined range covering a resonant frequency of the left driving system and the right driving system while the vehicle is running straight, and the third difference model includes the band-pass filter that extracts a difference-mode frequency band in a second predetermined range covering a resonant frequency of the left driving system and the right driving system while the vehicle is cornering, the difference-mode frequency band not overlapping the sum-mode frequency band.

17. A vehicle control method for a vehicle, the vehicle comprising: a left driving system including a left axle and a left wheel, motion power from a left driving source being transmitted to the left axle and the left wheel; a right driving system including a right axle and a right wheel, motion power from a right driving source being transmitted to the right axle and the right wheel; and detectors that each detect one of an actual speed of the left driving system or the left driving source and an actual speed of the right driving system or the right driving source the vehicle control method comprising:

calculating a first equivalent sum value corresponding to a sum of a left requested torque being a requested torque to the left driving system or the left driving source and a right requested torque being a requested torque to the right driving system or the right driving source and calculating a first equivalent difference value corresponding to a difference between the left requested torque and the right requested torque;

outputting a first instruction torque to control the left driving source and the right driving source by performing a feed-forward control using the first equivalent sum value and the first equivalent difference value;

estimating, based on the first instruction torque, an estimated sum speed corresponding to a sum of an estimated speed of the left driving source and an estimated speed of the right driving source and an estimated difference speed corresponding to a difference between the two estimated speeds;

calculating a second equivalent sum value corresponding to a sum of the two actual speeds and a second equivalent difference value corresponding to a difference between the two actual speeds;

outputting a second instruction torque to control the left driving source and the right driving source by performing a feed-back control based on a gap between the second equivalent sum value and the estimated sum speed and a gap between the second equivalent difference value and the estimated difference speed; and controlling outputs of the left driving source and the right driving source, using the first instruction torque and the second instruction torque.

* * * * *